US009619941B2

(12) United States Patent
Ueno et al.

(10) Patent No.: US 9,619,941 B2
(45) Date of Patent: Apr. 11, 2017

(54) VIRTUAL PLAY AREA DISPLAY DEVICE, CONTROL SYSTEM, AND CONTROL PROGRAM

(71) Applicant: KYOCERA Corporation, Kyoto-shi, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,617

(22) PCT Filed: Sep. 26, 2013

(86) PCT No.: PCT/JP2013/076063
§ 371 (c)(1),
(2) Date: Mar. 26, 2015

(87) PCT Pub. No.: WO2014/050966
PCT Pub. Date: Apr. 3, 2014

(65) Prior Publication Data
US 2015/0243082 A1 Aug. 27, 2015

(30) Foreign Application Priority Data

Sep. 27, 2012 (JP) .................. 2012-215078

(51) Int. Cl.
*G02B 27/01* (2006.01)
*G06F 3/01* (2006.01)
(Continued)

(52) U.S. Cl.
CPC .......... *G06T 19/006* (2013.01); *A63F 13/213* (2014.09); *A63F 13/25* (2014.09);
(Continued)

(58) Field of Classification Search
CPC .... A63F 13/213; A63F 13/25; A63F 13/5255; A63F 13/55; A63F 13/80;
(Continued)

(56) References Cited

U.S. PATENT DOCUMENTS 6,679,780 B1 * 1/2004 Shih ...................... A63F 9/1204
273/156
2002/0084974 A1 7/2002 Ohshima et al.
(Continued)

FOREIGN PATENT DOCUMENTS

CN 102193625 A 9/2011
JP 11-475 A 1/1999
(Continued)

OTHER PUBLICATIONS

Andersen, T. L., et al.; "Designing an augmented reality board game with children: The Battleboard 3D experience". In Proceedings of OZCHI 2004, 2004, New York: ACM Press, p. 137-138.*
(Continued)

*Primary Examiner* — Jin-Cheng Wang
(74) *Attorney, Agent, or Firm* — Hauptman Ham, LLP

(57) ABSTRACT

According to one of aspects, a display device includes: a display unit; a control unit; and a detection unit. The display unit stereoscopically displays a plurality of three-dimensional blocks each including one or more elements each occupying one of divided sections in a virtual play region divided in a three-dimensional matrix manner in a display space. The detection unit detects a position of a body in the display space. The control unit controls the display unit to cause a movable three-dimensional block to appear. When change of the body with time in the display space is detected by the detection unit, the control unit controls the display unit to move the movable three-dimensional block. When all sections of one layer in the play region are filled with
(Continued)

elements of the plurality of three-dimensional and the movable three-dimensional block, the control unit controls the display unit to erase the elements.

26 Claims, 30 Drawing Sheets

(51) Int. Cl.

| | | |
|---|---|---|
| G06T 19/00 | (2011.01) | |
| G06T 19/20 | (2011.01) | |
| G06F 3/0346 | (2013.01) | |
| G02B 27/02 | (2006.01) | |
| G02B 27/22 | (2006.01) | |
| G06F 3/048 | (2013.01) | |
| G09G 5/00 | (2006.01) | |
| G09G 5/36 | (2006.01) | |
| G09G 5/38 | (2006.01) | |
| A63F 13/25 | (2014.01) | |
| A63F 13/213 | (2014.01) | |
| A63F 13/80 | (2014.01) | |
| A63F 13/55 | (2014.01) | |
| G09G 3/00 | (2006.01) | |
| H04N 13/04 | (2006.01) | |
| A63F 13/5255 | (2014.01) | |

(52) U.S. Cl.
CPC .......... *A63F 13/5255* (2014.09); *A63F 13/55* (2014.09); *A63F 13/80* (2014.09); *G02B 27/017* (2013.01); *G02B 27/0172* (2013.01); *G02B 27/02* (2013.01); *G02B 27/22* (2013.01); *G06F 3/01* (2013.01); *G06F 3/017* (2013.01); *G06F 3/0346* (2013.01); *G06F 3/048* (2013.01); *G06T 19/00* (2013.01); *G06T 19/20* (2013.01); *G09G 3/003* (2013.01); *G09G 5/00* (2013.01); *G09G 5/36* (2013.01); *G09G 5/38* (2013.01); *H04N 13/0468* (2013.01); *G02B 2027/014* (2013.01); *G02B 2027/0134* (2013.01); *G02B 2027/0178* (2013.01); *G02B 2027/0187* (2013.01); *G06T 2219/2004* (2013.01); *G06T 2219/2016* (2013.01); *G09G 2354/00* (2013.01)

(58) Field of Classification Search
CPC ...... G02B 2027/0134; G02B 2027/014; G02B 2027/0178; G02B 2027/0187; G02B 27/017; G02B 27/0172; G02B 27/02; G02B 27/22; G06F 3/01; G06F 3/017; G06F 3/033; G06F 3/0346; G06F 3/048; G06T 19/00; G06T 19/006; G06T 19/20; G06T 2219/2004; G06T 2219/2016; G09G 2354/00; G09G 3/003; G09G 5/00; G09G 5/36; G09G 5/38; H04N 13/0458; H04N 13/004; H04N 13/0275
USPC .......... 345/633, 8, 660–661, 419, 424, 157; 463/9
See application file for complete search history.

(56) References Cited

U.S. PATENT DOCUMENTS

| | | | |
|---|---|---|---|
| 2003/0156144 A1 | 8/2003 | Morita | |
| 2005/0219268 A1* | 10/2005 | Kyle | G08G 1/0969 345/660 |
| 2005/0276444 A1* | 12/2005 | Zhou | G06F 3/04815 382/103 |
| 2006/0033272 A1* | 2/2006 | Chen | A63F 9/12 273/156 |
| 2007/0024644 A1* | 2/2007 | Bailey | G06F 3/011 345/633 |
| 2007/0075967 A1* | 4/2007 | Yoshihara | A63F 13/10 345/157 |
| 2007/0257906 A1* | 11/2007 | Shimura | A63F 13/10 345/419 |
| 2009/0197658 A1* | 8/2009 | Polchin | A63F 13/02 463/9 |
| 2010/0016049 A1* | 1/2010 | Shirakawa | A63F 13/10 463/9 |
| 2011/0164029 A1* | 7/2011 | King | G06F 3/04883 345/419 |
| 2011/0205243 A1 | 8/2011 | Matsuda | |
| 2011/0304651 A1* | 12/2011 | Shimura | A63F 13/10 345/661 |
| 2012/0013072 A1* | 1/2012 | Loveland | A63F 9/1204 273/157 R |
| 2012/0212509 A1* | 8/2012 | Benko | G03B 35/00 345/633 |
| 2012/0322556 A1* | 12/2012 | Rogers | A63F 13/10 463/37 |
| 2013/0063480 A1* | 3/2013 | Tada | A63F 13/10 345/619 |
| 2014/0104274 A1* | 4/2014 | Hilliges | G06F 3/011 345/424 |
| 2014/0267028 A1 | 9/2014 | Matsuda | |
| 2015/0356788 A1* | 12/2015 | Abe | G06T 19/006 345/633 |

FOREIGN PATENT DOCUMENTS

| | | |
|---|---|---|
| JP | 11-136706 A | 5/1999 |
| JP | 2003-242527 A | 8/2003 |
| JP | 2005-157611 A | 6/2005 |
| JP | 2011-8351 A | 1/2011 |
| JP | 2011-95547 A | 5/2011 |
| JP | 2011-101677 A | 5/2011 |
| JP | 2011-175439 A | 9/2011 |

OTHER PUBLICATIONS

Wichert, R.: Collaborative gaming in a mobile augmented reality environment.—in Eurographics—Ibero-American Symposium in Computer Graphics—SIACG 2002 Proceedings, Guimarães, Portugal (2002), 31-37.*
International Search Report and Written Opinion mailed Dec. 24, 2013 in corresponding International Application No. PCT/JP2013/076063.
"Kukan Haaku Noryoku ga Yashinaeru 3 Jigen Tetris 'Tetrical'", [online], Designworks Archive, Designworks, Jan. 9, 2008 (Jan. 9, 2008), [retrieval date Dec. 11, 2013 ( Dec. 11, 2013)], <URL: http://designwork-s.com/article/77350801.html>.
Szalava'ri, Zsolt et al, "Collaborative Gaming in Augmented Reality", [online], Virtual Reality Software and Technology, VRST 1998,May 11, 1998, p. 195-204, [retrieval date Dec. 11, 2013 (Dec. 11, 2013)], <URL: http://www.cg.tuwien.ac.at/research/vr/gaming/mah-jongg/vrst98.pdf> (Refer to the following URLs for the date of 'VRST 1998' and the page posting "Collaborative Gaming in Augmented Reality" <URL: http://www.inforrnatik.uni-trier.de/-ley/db/conf/vrst/vrst1998.html>).
Office Action in CN Application No. 201380050492.9, dated Aug. 22, 2016, for which an explanation of relevance is attached.

* cited by examiner

FIG.10
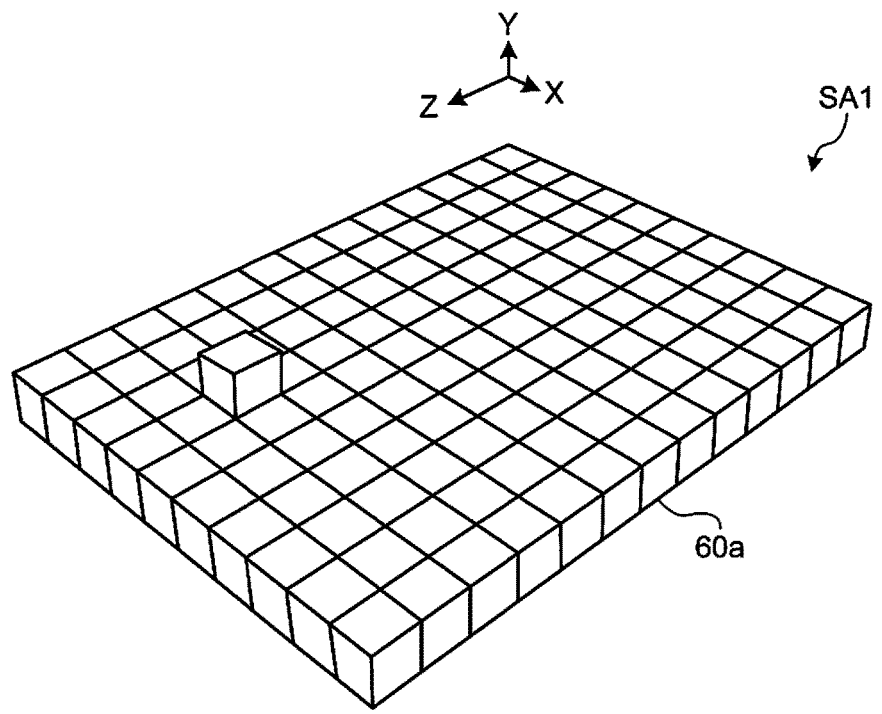
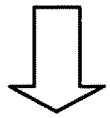
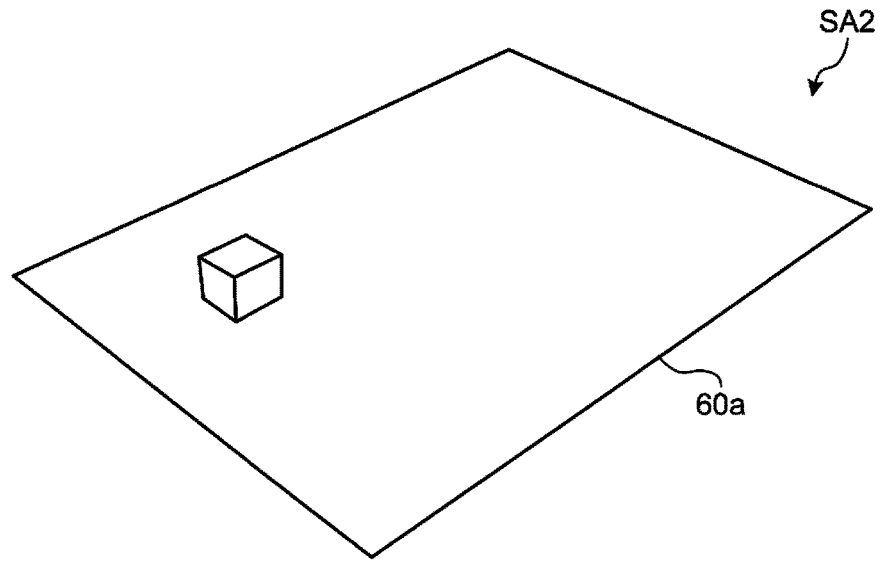

FIG.17
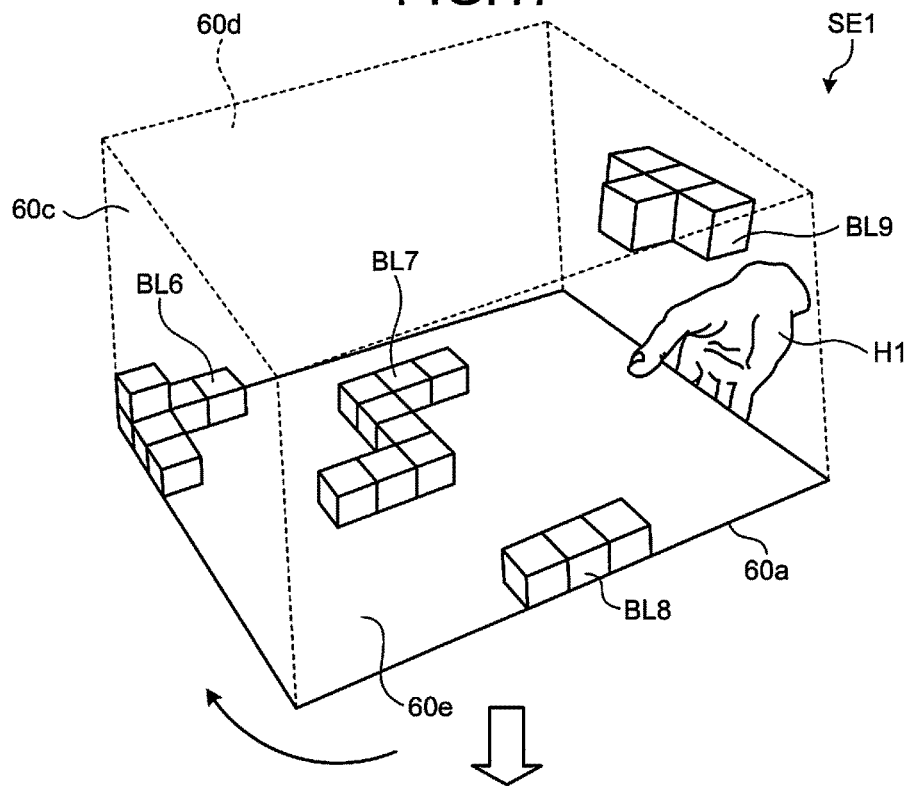
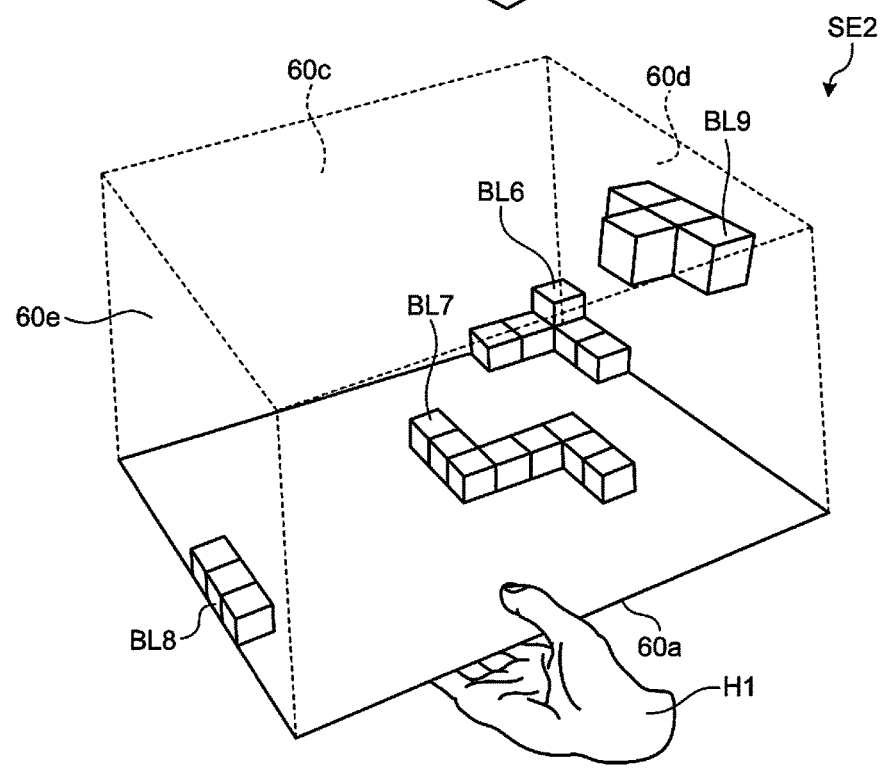

FIG.18
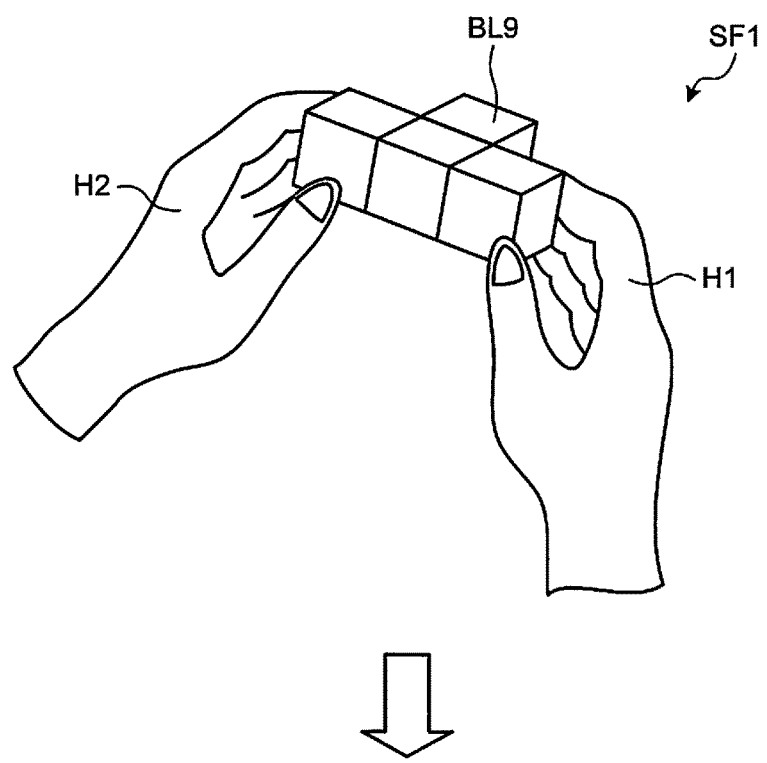
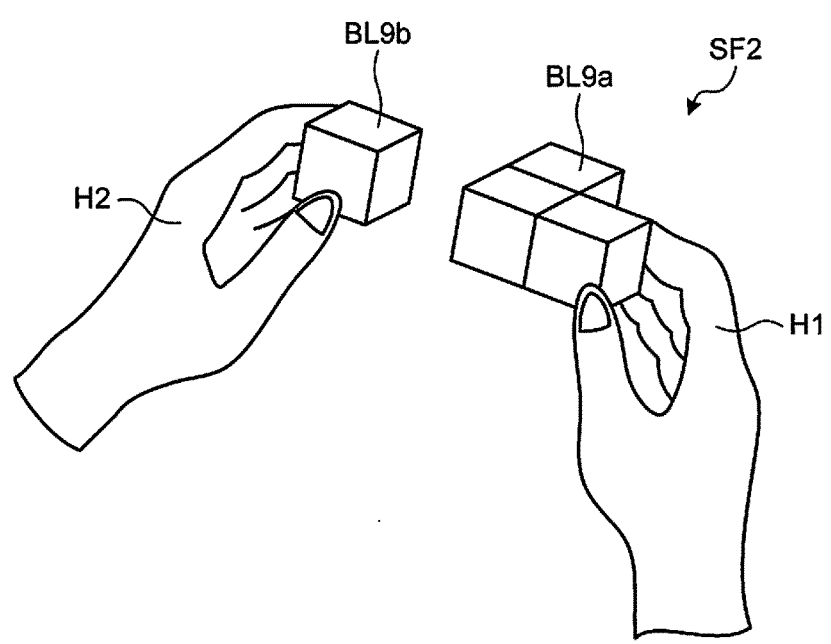

FIG.21
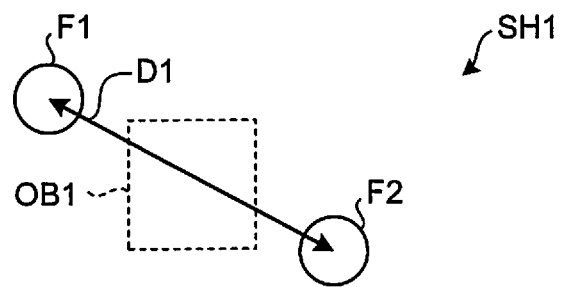
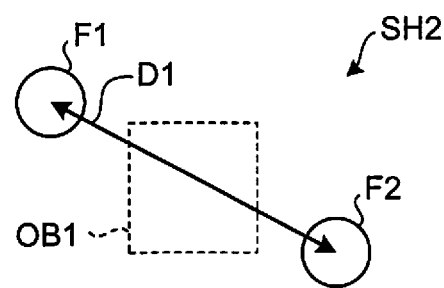
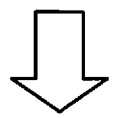
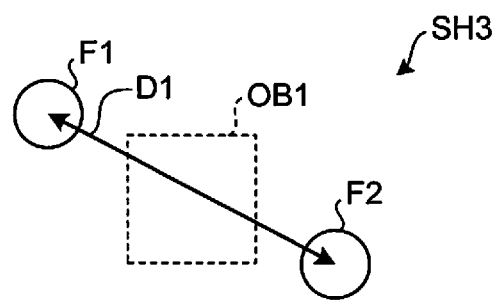

| FUL-CRUM | OBSTACLE | SPEED OF PRESSING | CHANGE |
|---|---|---|---|
| ABSENT | ABSENT | * | MOVED IN DIRECTION OF PRESSING ACCORDING TO AMOUNT OF PRESSING |
| | STOPPED THREE-DIMENSIONAL BLOCK OR FACE OF PLAY REGION | * | MOVED IN DIRECTION OF PRESSING ACCORDING TO AMOUNT OF PRESSING NOT MOVED AFTER COMING IN CONTACT WITH OBSTACLE |
| | MOVING THREE-DIMENSIONAL BLOCK | SLOW | MOVED IN DIRECTION OF PRESSING ACCORDING TO AMOUNT OF PRESSING MOVED TOGETHER WITH OBSTACLE AFTER COMING IN CONTACT WITH OBSTACLE |
| | | FAST | MOVED IN DIRECTION OF PRESSING ACCORDING TO AMOUNT OF PRESSING MOVED SUCH THAT OBSTACLE IS FLICKED WHEN COMING IN CONTACT WITH OBSTACLE |
| PRESENT | ABSENT | * | ROTATED AROUND FULCRUM |

VIRTUAL PLAY AREA DISPLAY DEVICE, CONTROL SYSTEM, AND CONTROL PROGRAM

CROSS-REFERENCE TO RELATED APPLICATION

This application is a National Stage of PCT international application Ser. No. PCT/JP2013/076063 filed on Sep. 26, 2013 which designates the United States, incorporated herein by reference, and which is based upon and claims the benefit of priority from Japanese Patent Application No. 2012-215078 filed on Sep. 27, 2012, the entire contents of which are incorporated herein by reference.

FIELD

The present disclosure relates to a display device, a control system, and a control program.

BACKGROUND

Among display devices that include a display unit, such as mobile phones, there are ones that can stereoscopically display images and the like (for example, see Patent Literature 1). The stereoscopic display is realized using binocular parallax.

Further, there is a game device that can execute an application of a 3D game. For example, the game device described in Patent Literature 2 executes a 3D game using a cubic puzzle displayed in three-dimensional computer graphics.

CITATION LIST

Patent Literature

Patent Literature 1: JP 2011-95547 A
Patent Literature 2: JP 2011-101677 A

Technical Problem

Although the stereoscopic display is a display format that is friendly to users, the stereoscopic display is used only for the purpose of viewing and is not used for improving convenience of operations in the conventional display devices. Further, although there are applications of 3D games such as the cubic puzzle, only one specific object can be selected with an operation button at a time, and it takes time to get used to the operation in the conventional game devices.

For the foregoing reasons, there is a need for a display device, a control system, and a control program, which can provide the users with a highly convenient operation method.

SUMMARY

According to one of aspects, a display device includes: a display unit; a control unit configured to control the display unit; and a detection unit. The display unit stereoscopically displays a plurality of three-dimensional blocks each including one or a plurality of elements each occupying one of divided sections in a virtual play region divided in a three-dimensional matrix manner in a display space, by displaying images respectively corresponding to both eyes of a user by being worn. The detection unit detects a position of a body in the display space. The control unit controls the display unit to cause a movable three-dimensional block to appear. When change of the body with time in the display space is detected by the detection unit, the control unit controls the display unit to move the movable three-dimensional block in section units based on a result of the detecting. When all sections of one layer in the play region are filled with elements of the plurality of three-dimensional and the movable three-dimensional block due to movement of the movable three-dimensional block, the control unit controls the display unit to erase the elements.

According to one of aspects, a control system includes a terminal and a control unit configured to control the terminal. The terminal includes: a display unit that stereoscopically displays a plurality of three-dimensional blocks each including one or a plurality of elements each occupying one of divided sections in a virtual play region divided in a three-dimensional matrix manner in a display space, by displaying images respectively corresponding to both eyes of a user by being worn; and a detection unit that detects a position of a body in the display space. The control unit controls the display unit to cause a movable three-dimensional block to appear. When change of the body with time in the display space is detected by the detection unit, the control unit controls the display unit to move the movable three-dimensional block in section units based on a result of the detecting. When all sections of one layer in the play region are filled with elements of the plurality of three-dimensional and the movable three-dimensional block due to movement of the movable three-dimensional block, the control unit controls the display unit to erase the elements.

According to one of aspects, a non-transitory storage medium stores therein a control program. When executed by a display device including a display unit that stereoscopically displays three-dimensional shapes in a display space, by displaying images respectively corresponding to both eyes of a user by being worn, and a detection unit that detects a position of a body in the display space, the control program causes the display device to execute: displaying a plurality of three-dimensional blocks each including one or a plurality of elements each occupying one of divided sections to appear in a virtual play region divided in a three-dimensional matrix manner in the display space; causing a movable three-dimensional block to appear in the display space; moving the movable three-dimensional block in section units when change of the body with time in the display space is detected; and erasing, when all sections of one layer of the play region are filled with elements of the plurality of three-dimensional and the movable three-dimensional block due to movement of the movable three-dimensional block, the elements.

Advantageous Effects of Invention

One of embodiments of the present invention exhibits an effect to provide the users with a highly convenient operation method.

BRIEF DESCRIPTION OF DRAWINGS

FIG. 10 is a diagram illustrating one of examples of erasing a layer.

FIG. 17 is a diagram illustrating one of examples of an operation to treat a face of the play region as a three-dimensional object.

FIG. 18 is a diagram illustrating one of examples of an operation to disjoin a three-dimensional block.

FIG. 21 is a diagram for describing detection of an operation performed by holding the three-dimensional object.

FIG. 27 is a diagram illustrating one of examples of information stored in acting data.

DESCRIPTION OF EMBODIMENTS

Hereinafter, embodiments will be described in details with reference to the drawings. The present invention is not limited by the description below. Configuration elements in the description below include things which can be easily conceived by a person skilled in the art, which are substantially the same, and which are so-called equivalents.

Embodiment

Figure 1:
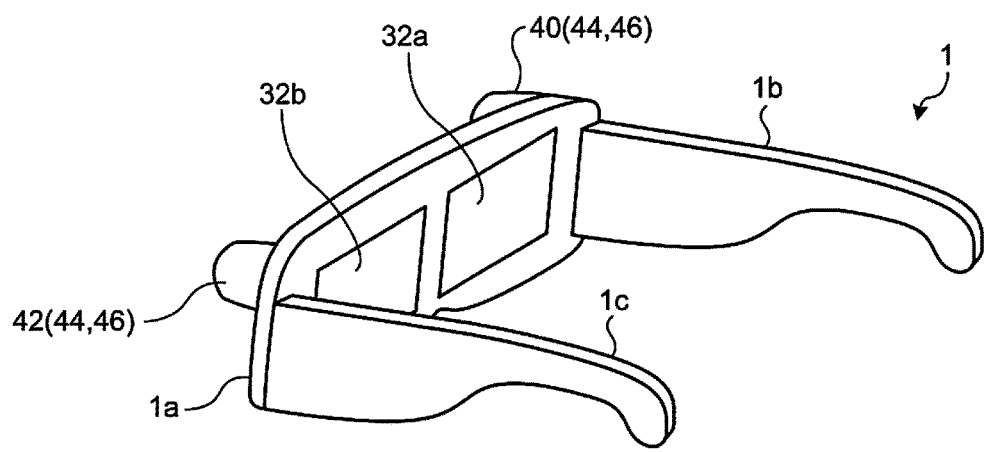
FIG. 1 is a perspective view of a display device.
Figure 2:
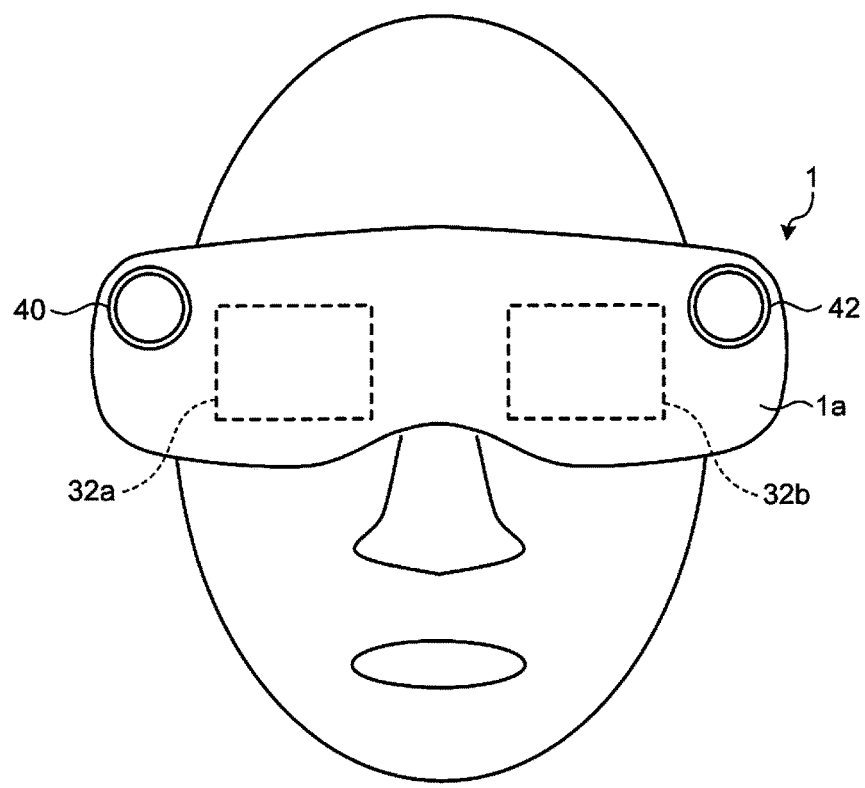
FIG. 2 is a diagram of the display device worn by a user as viewed from the front.

First of all, an overall configuration of a display device 1 according to an embodiment will be described with reference to FIGS. 1 and 2. FIG. 1 is a perspective view of the display device 1. FIG. 2 is a diagram of the display device 1 worn by a user as viewed from the front. As illustrated in FIGS. 1 and 2, the display device 1 is a head mount-type device that is worn on the head of the user.

The display device 1 includes a front portion 1a, a side portion 1b, and a side portion 1c. The front portion 1a is arranged in front of the user to cover both eyes of the user when being worn by the user. The side portion 1b is connected to one end portion of the front portion 1a, and the side portion 1c is connected to the other end portion of the front portion 1a. The side portion 1b and the side portion 1c are supported by ears of the user like temples of eyeglasses when being worn, and stabilize the display device 1. The side portion 1b and the side portion 1c may be configured to be connected at the rear of the head of the user when being worn.

The front portion 1a includes a display unit 32a and a display unit 32b on a side facing the eyes of the user when being worn. The display unit 32a is arranged at a position facing a right eye of the user when being worn, and the display unit 32b is arranged at a position facing a left eye of the user when being worn. The display unit 32a displays an image for the right eye, and the display unit 32b displays an image for the left eye. As described above, the display device 1 can realize three-dimensional display using binocular parallax by including the display units 32a and 32b that display the images corresponding to the respective eyes of the user when being worn.

The display units 32a and 32b may be configured from one display device as long as the device can independently provide different images for the right eye and the left eye of the user. For example, the one display device may be configured to independently provide the different images for the right eye and the left eye by quickly switching a shutter that shields one eye so that only the other eye can see a displayed image. The front portion 1a may be configured to cover the eyes of the user so that light from outside does not enter the eyes of the user when being worn.

The front portion 1a includes an imaging unit 40 and an imaging unit 42 on a face opposite to the face where the display unit 32a and the display unit 32b are provided. The imaging unit 40 is arranged near one end portion (a right eye side when being worn) of the front portion 1a, and the imaging unit 42 is arranged near the other end portion (a left eye side when being worn) of the front portion 1a. The imaging unit 40 acquires an image in a range corresponding to a field of view of the right eye of the user. The imaging unit 42 acquires an image in a range corresponding to a field of view of the left eye of the user. The field of view referred to here is, for example, a field of view of when the user sees the front.

The display device 1 displays an image captured by the imaging unit 40 in the display unit 32a as an image for the right eye, and displays an image captured by the imaging unit 42 in the display unit 32b as an image for the left eye. Therefore, the display device 1 can provide the user who wears the display device 1 with a scene similar to a scene that is viewed by the user who does not wear the display device 1, even if the field of view is shielded by the front portion 1a.

The display device 1 has a function to three-dimensionally display virtual information, and to enable the user to operate the virtual information, in addition to the function to provide the user with a real scene as described above. According to the display device 1, the virtual information is superimposed on the real scene and displayed as if actually existed. The user can operate the virtual information as if the user actually touched the virtual information using a hand, for example, and apply change such as movement, rotation, deformation, or the like to the virtual information. As described above, the display device 1 provides an intuitive and highly convenient operation method in regard to the virtual information. In the description below, the virtual information that is three-dimensionally displayed by the display device 1 may be called "three-dimensional object".

The display device 1 provides the user with a wide field of view similar to a case where the user does not wear the display device 1. Further, the display device 1 can arrange a three-dimensional object with an arbitrary size in an arbitrary position in the wide field of view. As described above, the display device 1 can display three-dimensional objects having various sizes in various positions in a wide space without limitation due to size of the display device.

Figure 3:
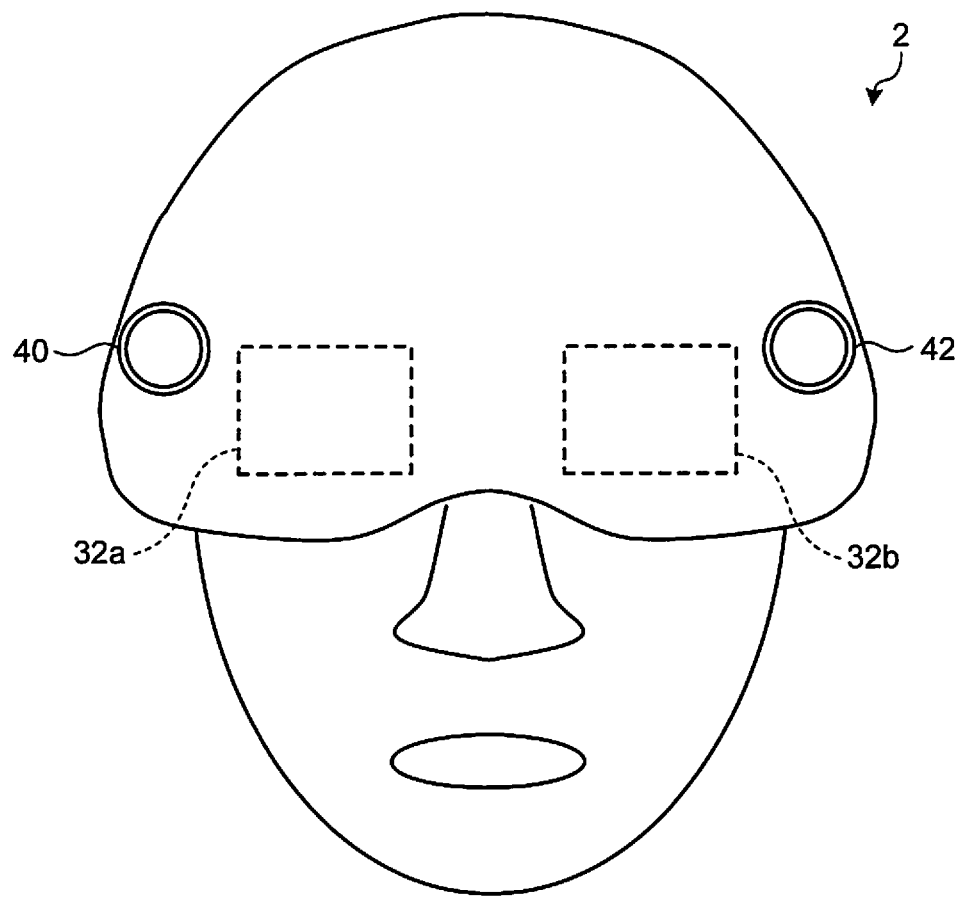
FIG. 3 is a diagram illustrating a modification of the display device.
Figure 4:
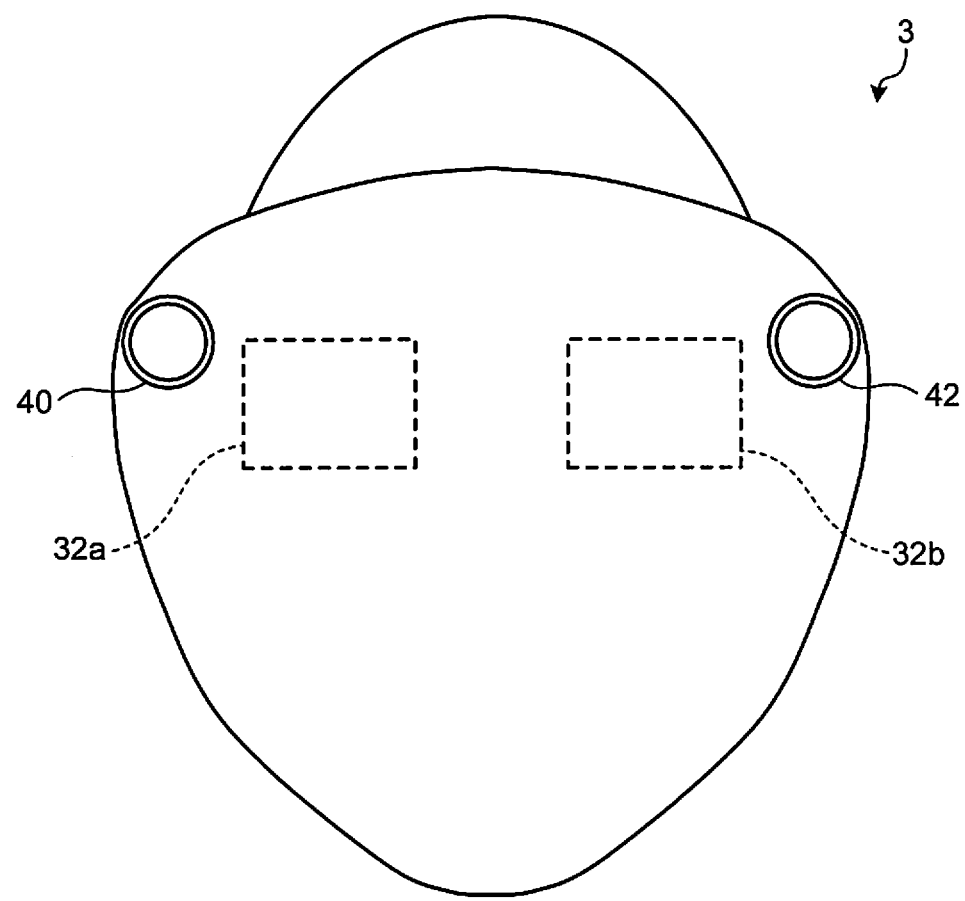
FIG. 4 is a diagram illustrating another modification of the display device.
Figure 5:
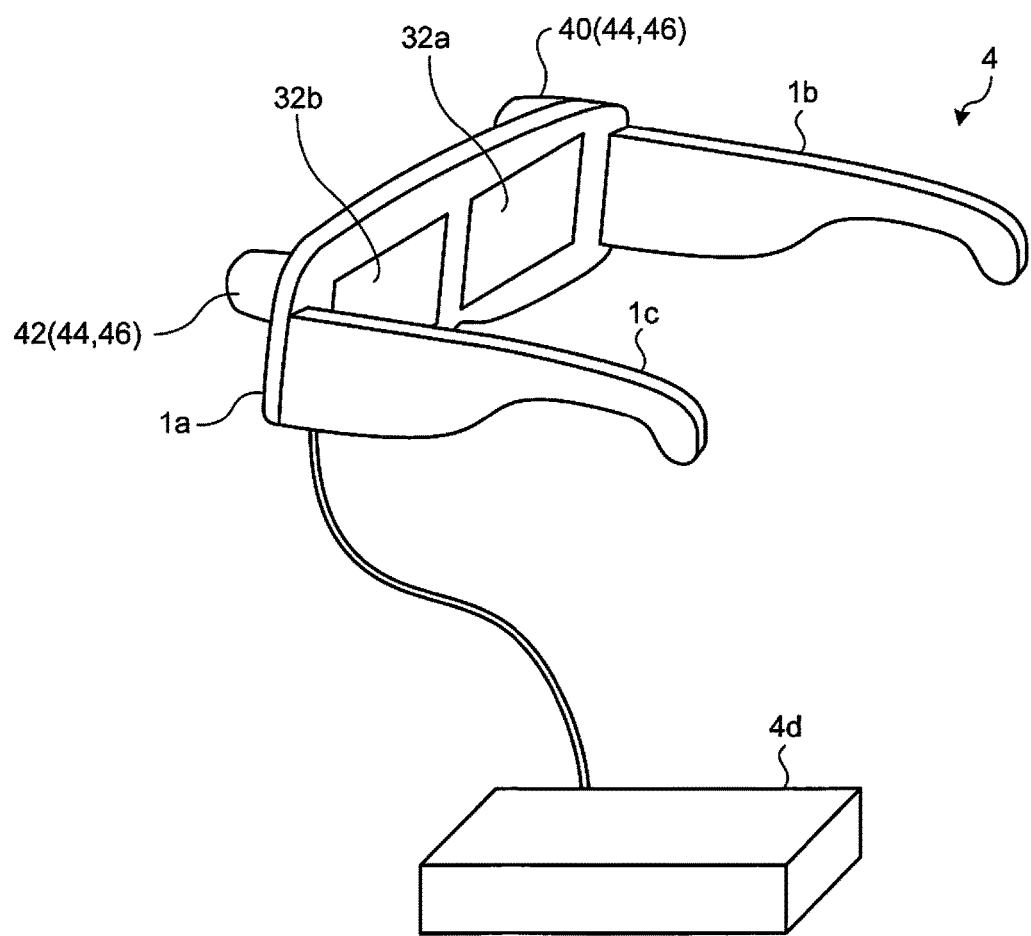
FIG. 5 is a diagram illustrating still another modification of the display device.

While, in FIGS. 1 and 2, one of examples in which the display device 1 has a shape of eyeglasses (goggles) has been described, the shape of the display device 1 is not limited thereto. For example, the display device 1 may have a helmet-type shape that substantially covers an upper half of the head of the user, like a display device 2 illustrated in FIG. 3. Alternatively, the display device 1 may have a mask-type shape that substantially covers the entire face of the user, like a display device 3 illustrated in FIG. 4. The display device 1 may be configured to be connected with an external device 4d such as an information processing device or a battery device in a wireless or wired manner, like a display device 4 illustrated in FIG. 5.

Figure 6:
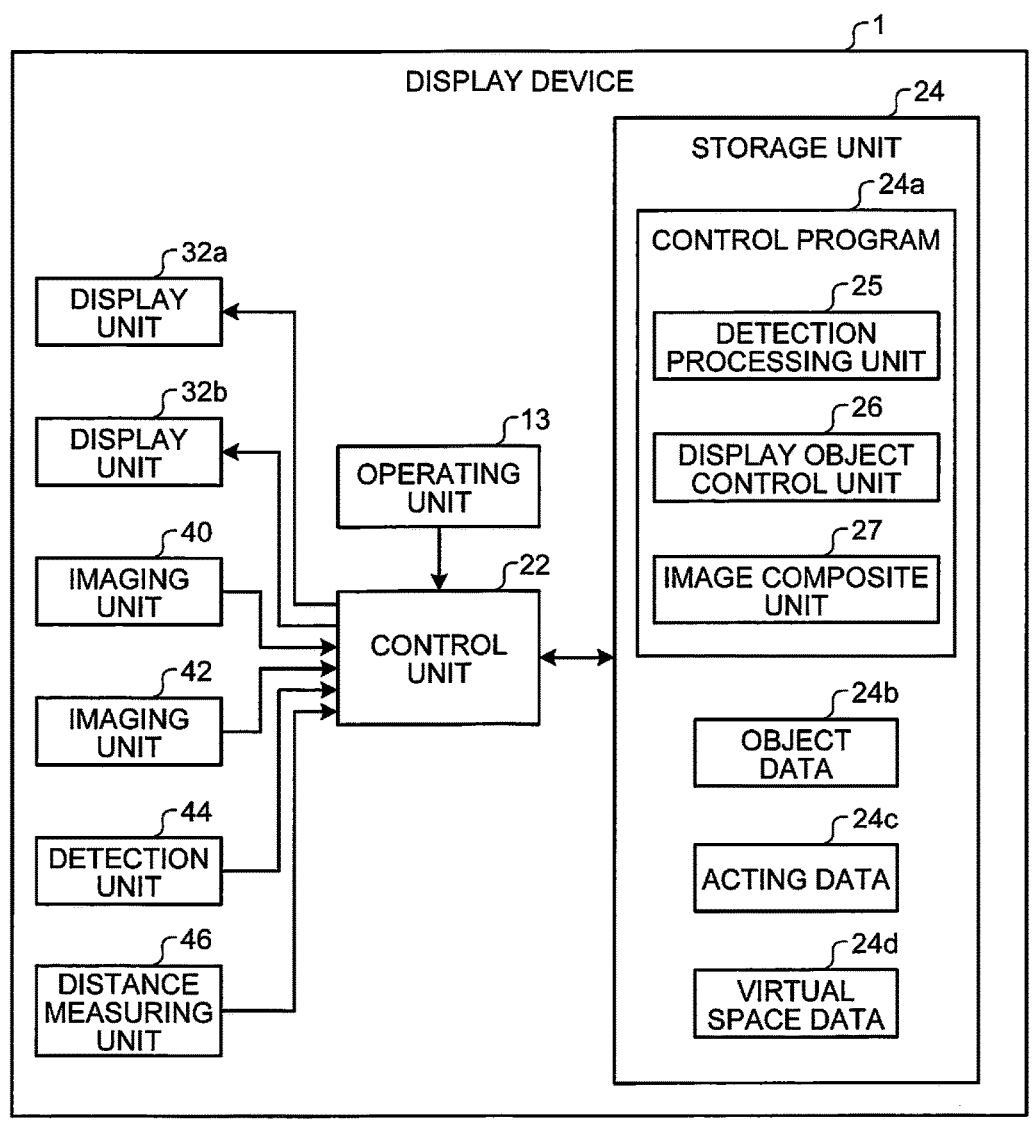
FIG. 6 is a block diagram of the display device.

Then, a functional configuration of the display device 1 will be described with reference to FIG. 6. FIG. 6 is a block diagram of the display device 1. As illustrated in FIG. 6, the display device 1 includes an operating unit 13, a control unit 22, a storage unit 24, the display units 32a and 32b, the imaging units 40 and 42, a detection unit 44, and a distance measuring unit 46. The operating unit 13 receives basic operations such as activation, stop, and change of an operation mode of the display device 1.

The display units 32a and 32b include a display such as a liquid crystal display or an organic electro-luminescence panel, and displays various types of information according to a control signal input from the control unit 22. The display units 32a and 32b may be projection devices that project images on retinas of the user using a light source such as a laser beam or the like.

The imaging units 40 and 42 electronically capture images using an image sensor such as a charge coupled device image sensor (CCD) or a complementary metal oxide semiconductor (CMOS). The imaging units 40 and 42 convert the captured images into signals, and output the signals to the control unit 22.

The detection unit 44 detects a real body existing in image ranges of the imaging units 40 and 42. For example, the detection unit 44 detects a body that is matched with a shape registered in advance (for example, a shape of a hand of a human), among real bodies existing in the image ranges. Even about a body, the shape of which is not registered in advance, the detection unit 44 may detect a range (the shape and the size) of the real body in the image based on brightness and/or chroma of pixels, edges of hue, and the like.

The distance measuring unit 46 measures distances to the real body existing in the image ranges of the imaging units 40 and 42. The distances to the real body are measured, for respective eyes, with respect to the positions of the respective eyes of the user who wears the display device 1. Therefore, when reference positions with which the distance measuring unit 46 measures the distances are deviated from the positions of the respective eyes, measured values of the distance measuring unit 46 are corrected to express the distances to the positions of the eyes according to the deviation.

In the present embodiment, each of the imaging units 40 and 42 may contain both a detection unit 44 and a distance measuring unit 46. That is, in the present embodiment, the imaging units 40 and 42 detect the body in the image ranges by analyzing the images imaged by the imaging units 40 and 42. Further, the imaging units 40 and 42 measure (calculate) the distance to the body by comparing the body included in the image captured by the imaging unit 40 and the body included in the image captured by the imaging unit 42.

The display device 1 may include the detection unit 44 separately from the imaging units 40 and 42. The detection unit 44 may be a sensor that detects the real body existing in the image ranges using at least one of visible light, infrared light, ultraviolet rays, a radio wave, a sound wave, magnetism, and capacitance, for example. The display device 1 may include the distance measuring unit 46 separately from the imaging units 40 and 42. The distance measuring unit 46 may be a sensor that detects the distance to the real body existing in the image ranges using at least one of the visible light, infrared light, ultraviolet rays, a radio wave, a sound wave, magnetism, and capacitance, for example. The display device 1 may include a sensor that can function as both of the detection unit 44 and the distance measuring unit 46, like a sensor using a time-of-flight (TOF) method.

The control unit 22 includes a central processing unit (CPU) as calculation means, and a memory as storage means, and realizes various functions by executing a program using these hardware resources. To be specific, the control unit 22 reads out a program and data stored in the storage unit 24 and loads the program and data to the memory, and causes the CPU to execute instructions included in the program loaded to the memory. The control unit 22 then reads/writes data from/to the memory and the storage unit 24, and controls operations of the display unit 32a and the like, according to execution results of the instructions by the CPU. When the CPU executes the instructions, the data loaded to the memory, and the operation detected through the detection unit 44 are used as a part of parameters or determination conditions.

The storage unit 24 is constituted of a non-volatile storage device such as a flash memory, and stores therein various programs and data. The programs stored in the storage unit 24 include a control program 24a. The data stored in the storage unit 24 include object data 24b, acting data 24c, and virtual space data 24d. The storage unit 24 may be configured by a combination of a portable storage medium such as a memory card, and a read/write device that perform reading/writing from/to the storage medium. In this case, the control program 24a, the object data 24b, the acting data 24c, and the virtual space data 24d may be stored in the storage medium. Further, the control program 24a, the object data 24b, the acting data 24c, and the virtual space data 24d may be acquired from another device such as a server via wireless or wired communication.

The control program 24a provides functions related to various types of control for operating the display device 1. The functions provided by the control program 24a include a function to superimpose a three-dimensional object on the images acquired by the imaging units 40 and 42 and display the superimposed images in the display units 32a and 32b, a function to detect an operation to the three-dimensional object, a function to change the three-dimensional object according to the detected operation, and the like. The control program 24a enables the user to enjoy stereoscopic play described below by controlling the display of the three-dimensional object and detecting the operation to the three-dimensional object.

The control program 24a includes a detection processing unit 25, a display object control unit 26, and an image composite unit 27. The detection processing unit 25 provides a function for detecting the real body existing in the image ranges of the imaging units 40 and 42. The function provided by the detection processing unit 25 includes a function to measure the distances to the detected respective bodies.

The display object control unit 26 provides a function for managing what types of three-dimensional objects are arranged in a virtual space, and in what state each of the three-dimensional objects is. The function provided by the display object control unit 26 includes a function to detect the operation to the three-dimensional object based on movement of the real body detected by the function of the detection processing unit 25, and change the three-dimensional object based on the detected operation.

The image composite unit 27 provides a function for generating an image to be displayed in the display unit 32a and an image to be displayed in the display unit 32b by compositing an image in a real space and an image in the virtual space. The function provided by the image composite unit 27 includes a function to determine front and rear relationship between the real body and the three-dimensional object, and adjust overlapping, based on the distance to the real body measured by the function of the detection processing unit 25, and the distance from a view point in the virtual space to the three-dimensional object.

The object data 24b includes information related to the shape and the properties of the three-dimensional object. The object data 24b is used for displaying the three-dimensional object. The acting data 24c includes information related to how the operation to the displayed three-dimensional object acts on the three-dimensional object. The acting data 24c is used for determining how to change the three-dimensional object when the operation to the displayed three-dimensional object is detected. The change referred to here includes movement, rotation, deformation, disappearance, and the like. The virtual space data 24d holds information related to a state of the three-dimensional object arranged in the virtual space. The state of the three-dimensional object includes, for example, a position, an attitude, a status of deformation, and the like.

Then, one of examples of control based on the functions provided by the control program 24a will be described with reference to FIG. 7. An image P1a is an image obtained by the imaging unit 40, that is, an image corresponding to a scene of the real space viewed by the right eye. In the image P1a, a table T1 and a hand H1 of the user appear. The display device 1 acquires an image of the same scene imaged by the imaging unit 42, that is, an image corresponding to a scene of the real space viewed by the left eye.

An image P2a is an image for the right eye generated based on the virtual space data 24d and the object data 24b. In this example, the virtual space data 24d holds information related to a state of a block-like three-dimensional object B1 existing in the virtual space, and the object data 24b holds information related to the shape and the properties of the three-dimensional object B1. The display device 1 reproduces a virtual space based on these pieces of information, and generates the image P2a that is the reproduced virtual space viewed from a view point of the right eye. The position of the right eye (view point) in the virtual space is determined based on a predetermined rule. Similarly, the display device 1 also generates an image that is the reproduced virtual space viewed from a view point of the left eye. That is, the display device 1 also generates an image that causes the three-dimensional object B1 to be three-dimensionally displayed in combination with the image P2a.

Figure 7:
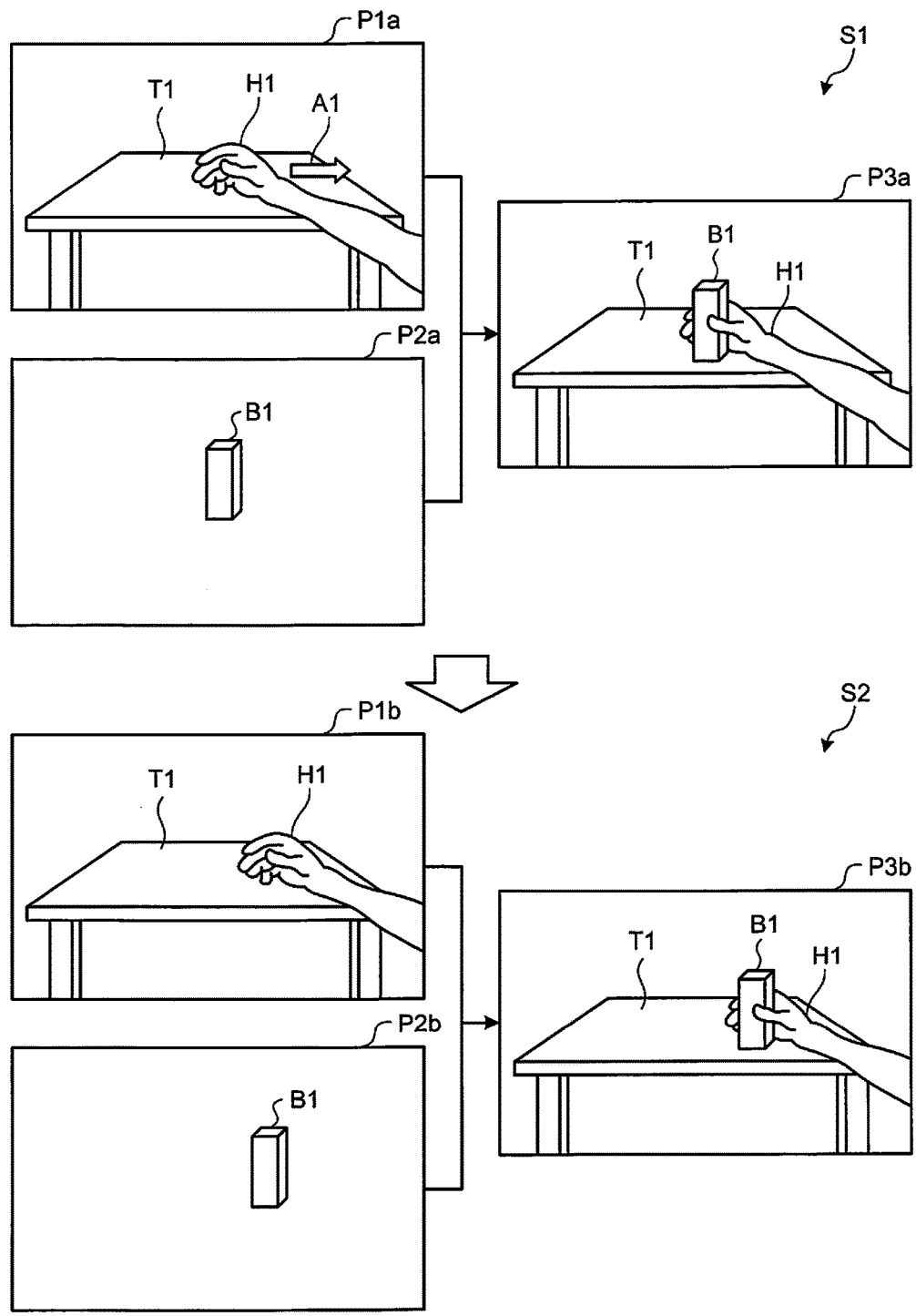
FIG. 7 is a diagram illustrating one of examples of control based on a function provided by a control program.

At Step S1 illustrated in FIG. 7, the display device 1 composites the image P1a and the image P2a to generate an image P3a. The image P3a is an image to be displayed in the display unit 32a as an image for the right eye. At this time, the display device 1 determines the front and rear relationship between the real body existing in the image range of the imaging unit 40 and the three-dimensional object existing in the virtual space using the position of the right eye of the user as a reference point. Then, when the real body and the three-dimensional object overlap with each other, the display device 1 adjusts the overlapping such that one that is closer to the right eye of the user can be seen in front.

Such adjustment of overlapping is performed for each range (for example, for each pixel) of a predetermined size within a region on the image where the real body and the three-dimensional object overlap with each other. Therefore, the distance from a view point to the real body in the real space is measured for each range of a predetermined size on the image. Further, the distance from the view point to the three-dimensional object in the virtual space is calculated for each range of a predetermined size on the image in consideration of the position, the shape, the attitude, and the like of the three-dimensional object.

In the scene of Step S1 illustrated in FIG. 7, the three-dimensional object B1 is arranged at a position in the virtual space, corresponding to right above a position where the table T1 exists in the real space. Further, in the scene of Step S1 illustrated in FIG. 7, the hand H1 of the user and the three-dimensional object B1 exist in substantially the same distance in substantially the same direction, using the position of the right eye of the user as a reference point. Therefore, the overlapping is adjusted for each range of a predetermined size, so that the hand H1 appears in front in a portion corresponding to the thumb of the hand H1, and the three-dimensional object B1 appears in front in other portions, of a region where the hand H1 and the three-dimensional object B1 overlap with each other in the composited image P3a. Further, the three-dimensional object B1 appears in front in a region where the table T1 and the three-dimensional object B1 overlap with each other.

With such adjustment of overlapping, at Step S1 illustrated in FIG. 7, the image P3a that can be seen as if the three-dimensional object B1 was placed on the table T1 and the user held the three-dimensional object B1 with the hand H1 can be obtained. By similar processing, the display device 1 composites the image captured by the imaging unit 42, and the image of the virtual space viewed from the view point of the left eye to generate an image to be displayed in the display unit 32b, as an image for the left eye. When the image for the left eye is generated, the overlapping of the real body and the three-dimensional object B1 is adjusted using the position of the left eye of the user as a reference point.

The display device 1 displays the composite images generated as described above in the display units 32a and 32b. As a result, the user can see the scene as if the three-dimensional object B1 was placed on the table T1, and the user held the three-dimensional object B1 with own hand H1.

In the scene of Step S1 illustrated in FIG. 7, the user moves the hand H1 in the direction of an arrow A1. In this case, in the scene of Step S2 illustrated in FIG. 7, an image obtained by the imaging unit 40 is changed to an image P1b in which the position of the hand H1 is moved to the right. Further, the display device 1 determines that the movement of the hand H1 is an operation to move the three-dimensional object B1 to the right while picking the three-dimensional object B1, and moves the position of the three-dimensional object B1 in the virtual space to the right according to the operation. The movement of the three-dimensional object B1 in the virtual space is reflected in the virtual space data 24d. As a result, the image for the right eye generated based on the virtual space data 24d and the object data 24b is changed to an image P2b in which the position of the three-dimensional object B1 is moved to the right. Details of detection of the operation by the display device 1 will be described below.

The display device 1 composites the image P1b and the image P2b to generate an image P3b for the right eye. The image P3b is an image that can be seen as if the user held the three-dimensional object B1 with the hand H1 at a further right side on the table T1 than the image P3a. Similarly, the display device 1 generates a composite image for the left eye. The display device 1 then displays the composite images generated as described above in the display units 32a and 32b. As a result, the user can see the scene as if the own hand H1 had picked the three-dimensional object B1 and moved it to the right.

Such update of the composite images for display is executed at a frequency (for example, 30 times per second) equivalent to a typical frame rate of a moving image. As a result, the change of the three-dimensional object according to the operation of the user is reflected to the image to be displayed in the display device 1 substantially in real time, and the user can operate the three-dimensional object as if the object actually existed, without a feeling of strangeness. Further, in the configuration according to the present embodiment, the hand of the user, which operates the three-dimensional object, is not positioned between the eyes of the user and the display units 32a and 32b, and thus the user can perform the operation without caring about the display of the three-dimensional object being shielded by the hand.

Figure 8:
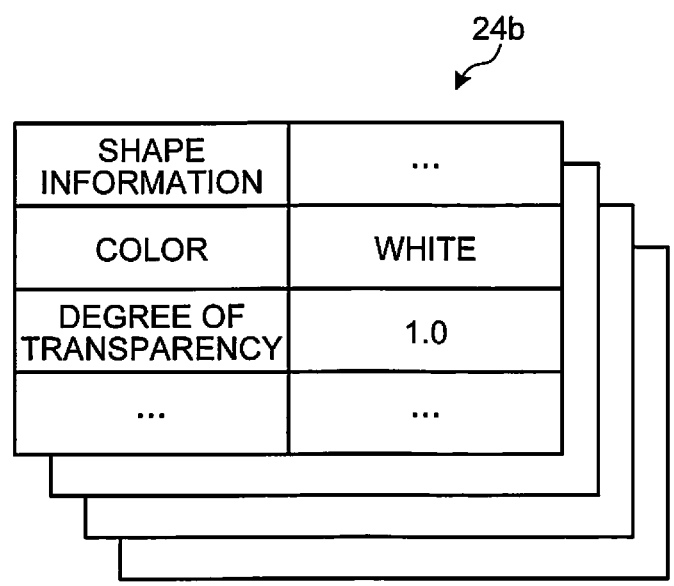
FIG. 8 is a diagram illustrating one of examples of information stored in object data.

Then, the object data 24b illustrated in FIG. 6 will be further described in detail with reference to FIG. 8. FIG. 8 is a diagram illustrating one of examples of information stored in the object data 24b. As illustrated in FIG. 8, in the object data 24b, information including shape information, a color, the degree of transparency, and the like is stored for each three-dimensional object. The shape information is information indicating the shape of the three-dimensional object. The shape information is a set of vertex coordinates of faces that configure the three-dimensional object, for example. The color is a color of a surface of the three-dimensional object. The degree of transparency is the degree at which the three-dimensional object transmits light. The object data 24b can hold information related to a plurality of three-dimensional objects.

Then, control of display of the three-dimensional object by the display device 1 and detection of an operation to the three-dimensional object, in play, will be described with reference to FIGS. 9 to 19. In the description below, a space viewed by the user who wears the display device 1 may be called display space.

Figure 9:
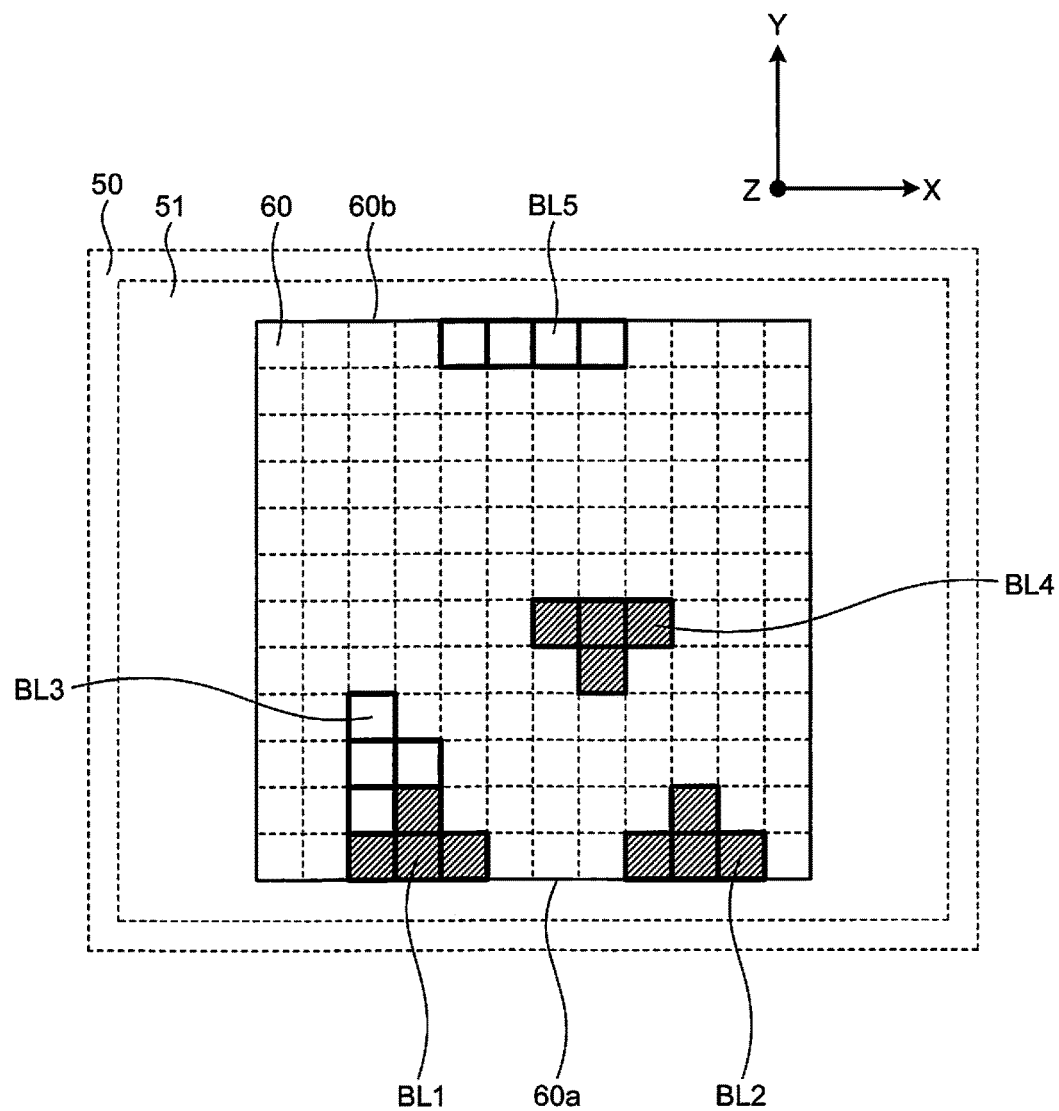
FIG. 9 is a schematic diagram illustrating one of examples of display of a three-dimensional object by the display device.

FIG. 9 is a schematic diagram illustrating one of examples of display of the three-dimensional object by the display device 1. As illustrated in FIG. 9, the display device 1 sets a play region 60 in a display space 50. The play region 60 is a cube-shaped virtual region divided in a three-dimensional matrix manner. Each section of the divided play region 60 has a cubic shape. In FIG. 9, for convenience of description, the divided sections of the play region 60 are illustrated by a dotted line. However, each section is not necessarily explicitly indicated.

The display device 1 may limit the space where the operation to the three-dimensional object is detected to an operable range 51. The operable range 51 is, for example, a range that the hand of the user who wears the display device 1 can reach. The space where the operation to the three-dimensional object is detected is limited in this way, whereby a load of calculation processing executed by the display device 1 in order to detect the operation can be reduced.

The display device 1 moves a three-dimensional block from an upper face 60b that is one of faces of the play region 60 toward a bottom face 60a facing the upper face 60b. The three-dimensional block is a three-dimensional object that occupies one or more pieces of the divided sections of the play region 60. The three-dimensional block has a plurality of types, and has different shape and color for each type. The shape and color in each type are defined in the object data 24b.

After causing the three-dimensional block to appear in the vicinity of the upper face 60b, the display device 1 moves the three-dimensional block toward the bottom face 60a with the passage of time. Then, the display device 1 cancels the movement of the three-dimensional block and causes the three-dimensional block to be in a stopped state when any face (a face facing the bottom face 60a) of the three-dimensional block in a moving direction comes in contact with the bottom face 60a. The display device 1 also causes the three-dimensional block to be in the stopped state when any of the faces of the three-dimensional block in the moving direction comes in contact with another three-dimensional block in the stopped state.

When a predetermined time elapses after causing one three-dimensional block to appear, the display device 1 causes a next three-dimensional block to appear. The next three-dimensional block may appear during movement of the previous three-dimensional block. To enhance playability, the display device 1 makes an interval to appear the three-dimensional block shorter bit by bit. The display device 1 may make the speed to move the three-dimensional block toward the bottom face 60a gradually faster in order to enhance the playability.

As a result of the appearance of the three-dimensional blocks one after another, a plurality of blocks piles up in the play region 60. For example, in the example illustrated in FIG. 9, three-dimensional block BL1 and three-dimensional block BL2 reach the bottom face 60a and are in the stopped state. Further, three-dimensional block BL3 piles up on the three-dimensional block BL1 and is in the stopped state. Further, three-dimensional block BL4 is moving, and three-dimensional block BL5 appears in the vicinity of the upper face 60b.

When the three-dimensional blocks pile up, and any of layers of the play region 60 is filled with elements of the three-dimensional blocks, the display device 1 erases the layer.

FIG. 10 is a diagram illustrating one of examples of erasing a layer. At Step SA1 illustrated in FIG. 10, a layer on the bottom face 60a is filled with the elements of the three-dimensional blocks. When a layer is filled in this way, the display device 1 erases the filled layer, as illustrated in Step SA2. Then, the display device 1 respectively moves portions positioned upper than the filled layer, of remained portions of the three-dimensional blocks that configure the filled layer, toward the bottom face 60a until any of faces facing the bottom face 60a comes in contact with the bottom face 60a or another three-dimensional block in the stopped state. In FIG. 10, the bottom face 60a is displayed in a visually recognizable manner. However, the bottom face 60a may not be displayed.

Every time erasing the filled layer, the display device 1 adds a score to the user. When another layer is erased by movement of the remained portions of the three-dimensional blocks due to erasure of the filled layer (a so-called chain occurs), the display device 1 adds a larger score than usual to the user. When the three-dimensional blocks pile up and no new three-dimensional block can appear, the display device 1 terminates the above-described control.

The user can enjoy the play for the purpose of obtaining as much score as possible using such control by the display device 1. To increase the score, the user can operate the moving three-dimensional block. To be specific, the user moves and/or rotates the moving three-dimensional block using a hand and a finger.

Figure 11:
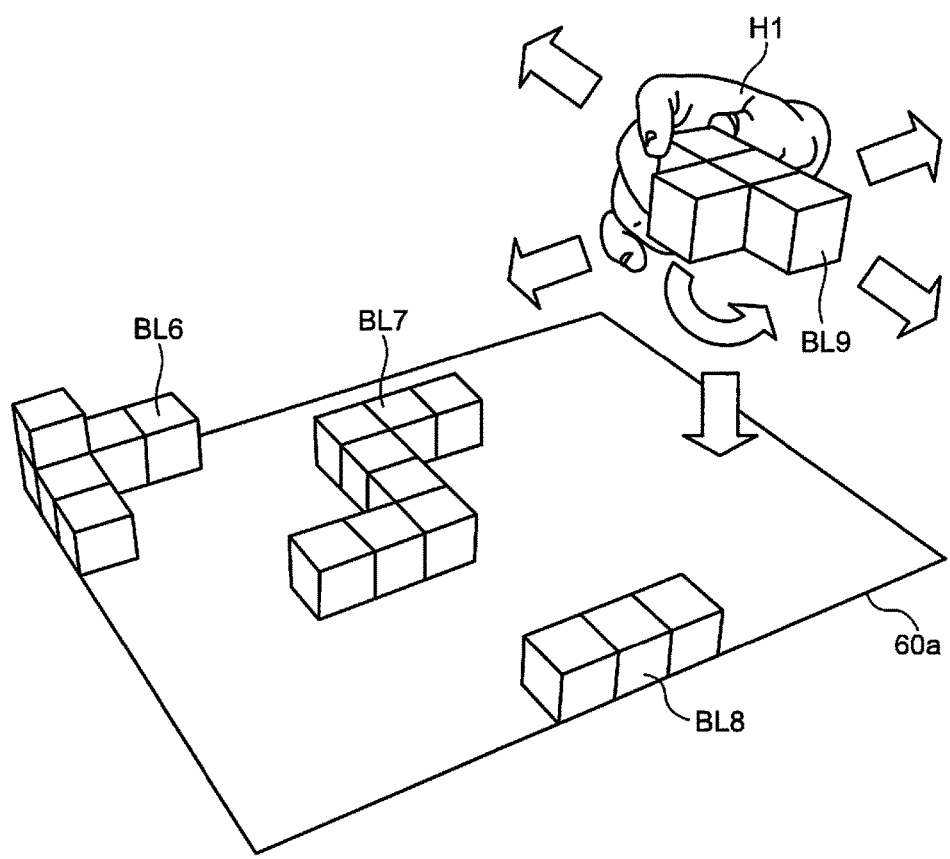
FIG. 11 is a diagram illustrating one of examples of an operation performed by holding the three-dimensional object.

FIG. 11 is a diagram illustrating one of examples of an operation performed by holding a three-dimensional object. In the example of FIG. 11, three-dimensional blocks BL6 to BL8 are in the stopped state, and three-dimensional block BL9 is moving. In this scene, when the display device 1 detects an operation of the user holding the three-dimensional block BL9 with a hand H1, and moving the hand H1 in an arbitrary direction, the display device 1 moves the three-dimensional block BL9 in accordance with the movement of the hand H1. Further, when the display device 1 detects an operation of the user holding the three-dimensional block BL9 with the hand H1, and rotating the hand H1, the display device 1 rotates the three-dimensional block BL9 in accordance with the rotation of the hand H1.

When the display device 1 detects an operation of the user releasing the hand from the three-dimensional block BL9, the display device 1 starts moving the three-dimensional block BL9 toward the bottom face 60a again. When the position or the direction of the three-dimensional block BL9 is deviated from the sections of the play region 60, the display device 1 adjusts the position and the direction of the three-dimensional block BL9 to the sections of the play region 60 with minimum correction. Further, the display device 1 limits the movement and the rotation of the three-dimensional block BL9 so that the three-dimensional block BL9 does not protrude from the play region 60, and the three-dimensional block BL9 does not enter an inside of another three-dimensional block. The display device 1 may limit upward movement of the three-dimensional block BL9 so as not to decrease difficulty.

Figure 12:
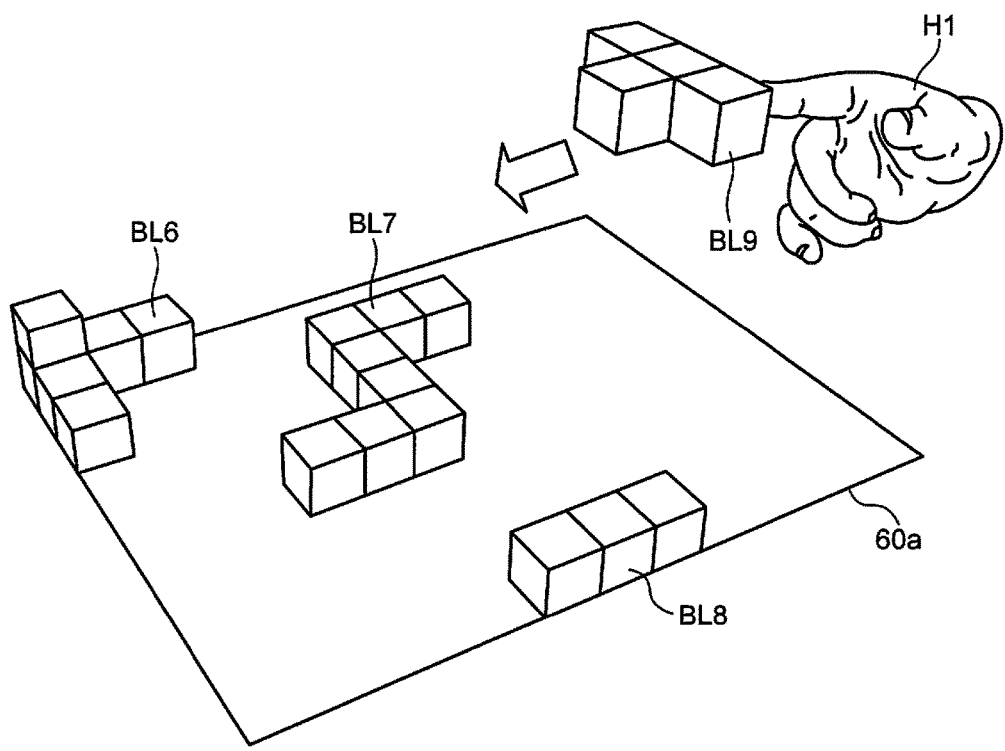
FIG. 12 is a diagram illustrating one of examples of an operation to press the three-dimensional object.

FIG. 12 is a diagram illustrating one of examples of an operation to press a three-dimensional object. In the example illustrated in FIG. 12, the three-dimensional blocks BL6 to BL8 are in the stopped state, and the three-dimensional block BL9 is moving. In this scene, when the display device 1 detects an operation of the user pressing the three-dimensional block BL9 with the hand H1, the display device 1 moves the three-dimensional block BL9 in accordance with the movement of the hand H1.

Then, when the display device 1 detects an operation of the user releasing the hand H1 from the three-dimensional block BL9, the display device 1 starts moving the three-dimensional block BL9 toward the bottom face 60a again. The display device 1 may continue moving the three-dimensional block BL9 toward the bottom face 60a during detection of the pressing operation of the user. When the position of the three-dimensional block BL9 is deviated from the sections of the play region 60, the display device 1 adjusts the position of the three-dimensional block BL9 to the sections of the play region 60 with minimum correction. Further, the display device 1 limits the movement of the three-dimensional block BL9 so that the three-dimensional block BL9 does not protrude from the play region 60, and the three-dimensional block BL9 does not enter the inside of another three-dimensional block.

By the change of the position and the direction of the three-dimensional block with the operation performed by holding the three-dimensional block or the pressing operation, the user can strategically fill the layer of the play region 60 to earn a score. The display device 1 may change the position and the direction of the three-dimensional block according to the operation of the user within a predetermined time (for example, within one second) after any of faces facing the bottom face 60a, of the three-dimensional block, comes in contact with the bottom face 60a or another three-dimensional block in the stopped state.

Figure 13:
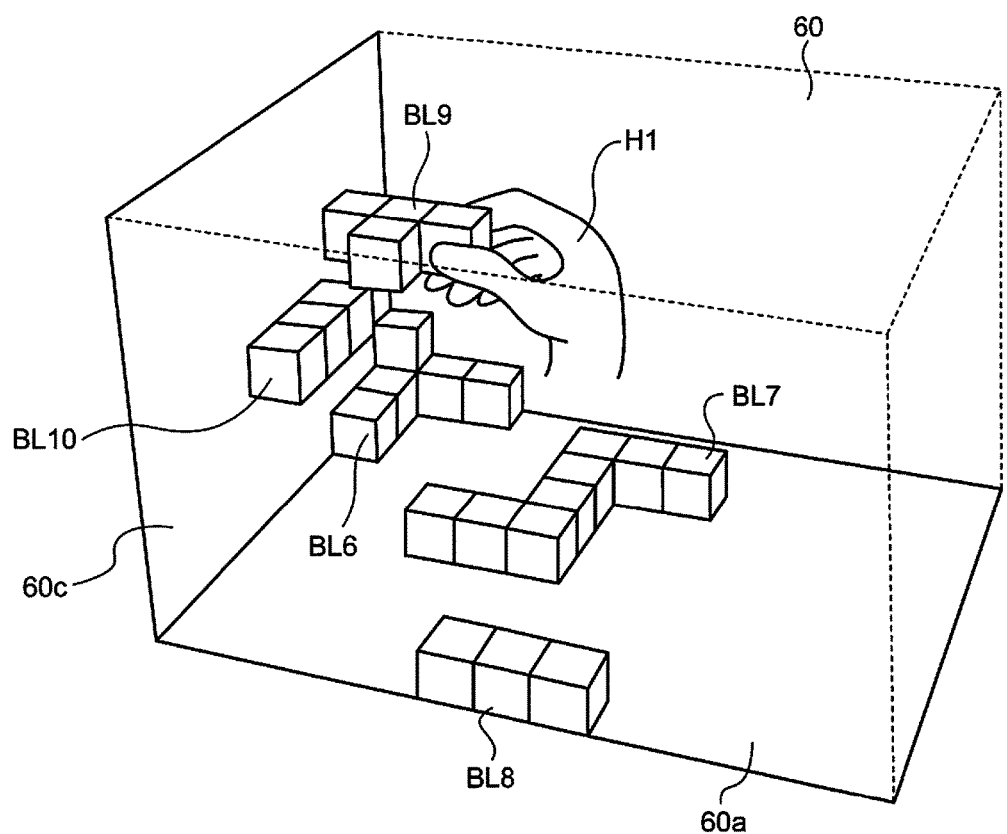
FIG. 13 is a diagram for describing stop of movement at a side face of a play region.

The display device 1 stops the three-dimensional block not only when the three-dimensional block reaches the bottom face 60a of the play region 60, but also when the three-dimensional block reaches a side face by the operation of the user. FIG. 13 is a diagram for describing stop of the movement on a side face of the play region 60. In the example of FIG. 13, three-dimensional block BL10 reaches a side face 60c of the play region 60 by the operation of the user, and is in the stopped state. Further, the three-dimensional block BL9 is about to reach the side face 60c of the play region 60 by the operation of the user. In FIG. 13, the side face 60c is displayed in a visually recognizable manner. However, the side face 60c may not be displayed.

When any face of the three-dimensional block comes in contact with the side face 60c of the play region 60 by the operation performed by holding or pressing the three-dimensional block, the display device 1 stops the three-dimensional block at the time point. The display device 1 may change the position and the direction of the three-dimensional block according to the operation of the user within a predetermined time (for example, within one second) after the three-dimensional block reaches the side face 60c of the play region 60, without causing the three-dimensional block to be in the stopped state.

When a layer parallel with the side face 60c of the play region 60 is filled due to the elements of the three-dimensional block that has reached the side face 60c of the play region 60, the display device 1 erases the layer. Then, the display device 1 respectively moves portions positioned at inner side of the play region 60 than the filled layer, of remained portions of the three-dimensional blocks that configure the filled layer, toward the bottom face 60a until any of faces thereof facing the bottom face 60a comes in contact with the bottom face 60a or another three-dimensional block in the stopped state.

The display device 1 may move the portions positioned at inner side of the play region 60 than the filled layer toward the side face 60c where the corresponding three-dimensional blocks have reached. The display device 1 may put the three-dimensional block back in a movable state again, when an operation to pick the three-dimensional block that has reached the side face 60c of the play region 60 and move the three-dimensional block toward a side opposite to the side face 60c is detected. That is, the display device 1 may allow the user to stick the three-dimensional block to the side face 60c, and to resume the movement at arbitrary timing.

Figure 14:
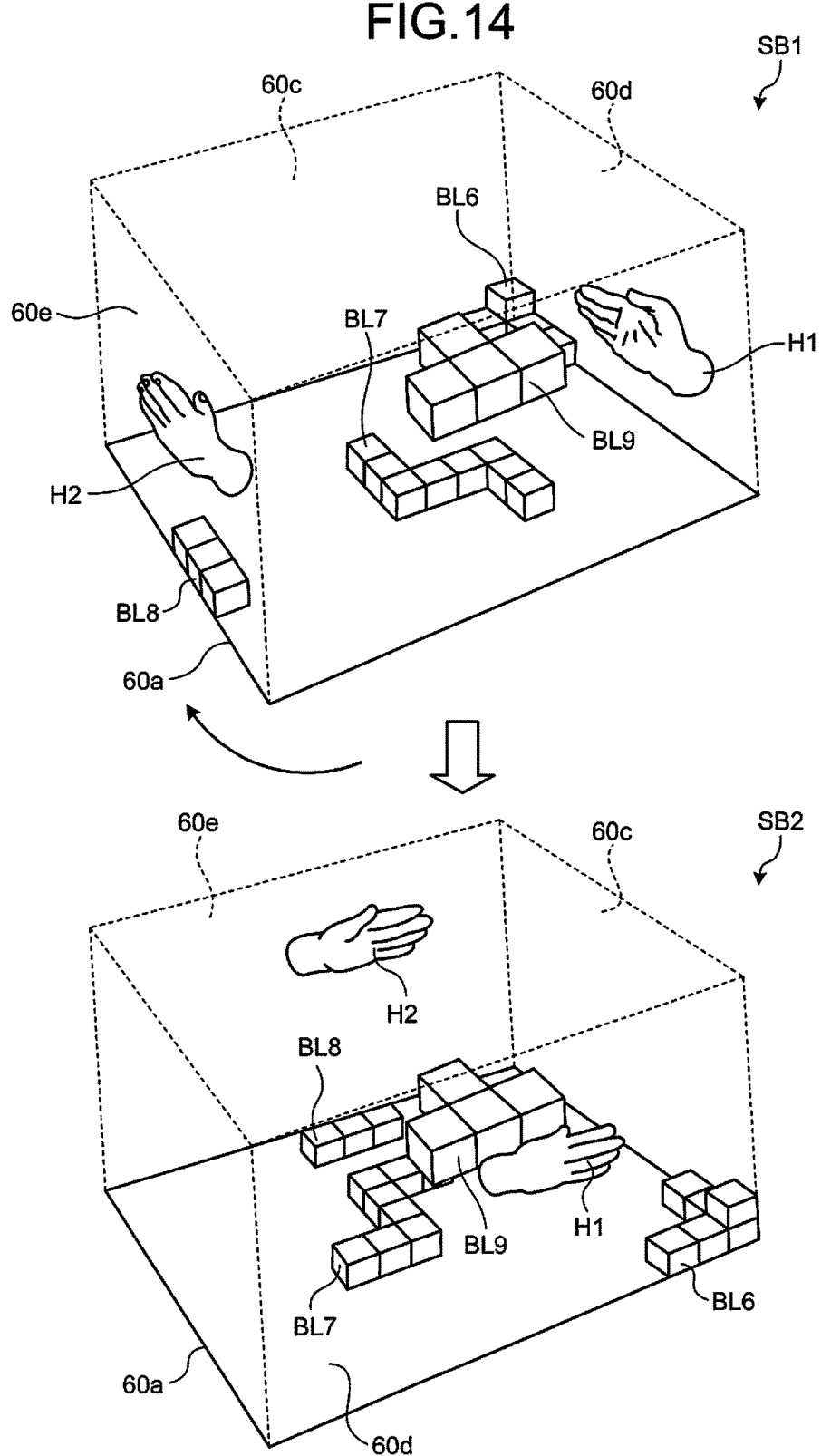
FIG. 14 is a diagram illustrating one of examples of an operation to treat the play region as a three-dimensional object.

The display device 1 also accepts an operation to treat the play region 60 as a three-dimensional object. FIG. 14 is a diagram illustrating one of examples of the operation to treat the play region 60 as a three-dimensional object. At Step SB1 illustrated in FIG. 14, the three-dimensional blocks BL6 to BL8 are in the stopped state, and the three-dimensional block BL9 is moving. In this scene, when the display device 1 detects an operation of the user holding the play region 60 with both hands from side faces 60d and 60e, and rotating the play region 60 in the horizontal direction, the display device 1 rotates the play region 60 in the horizontal direction in accordance with the movement of the both hands, as illustrated in Step SB2.

At this time, the display device 1 rotates the three-dimensional blocks in the stopped state together with the play region 60. As described above, by the rotation of the three-dimensional blocks in the stopped state together with the play region 60, the user can see an overlapping state of the three-dimensional blocks from an easily viewable direction. When the operation to rotate the play region 60 in the horizontal direction is detected, the display device 1 may or may not rotate the moving three-dimensional blocks together with the play region 60. The display device 1 may rotate the three-dimensional blocks other than the three-dimensional block held by the user, of the moving three-dimensional blocks, together with the play region 60, without rotating the three-dimensional block held by the user. Further, the display device 1 may correct the amount of rotation such that the play region 60 is rotated in units of 90 degrees.

The user performs the operation to rotate the play region 60 in the horizontal direction as follows. As illustrated in Steps SB1 and SB2, first of all, the user arranges the hand H1 to abut on the side face 60d of the play region 60, and arranges the hand H2 to abut on the side face 60e that faces the side face 60d. Then, the user rotates the hand H1 and the hand H2 as if there was a rotation axis in the center of the bottom face 60a, while keeping the interval between the hand H1 and the hand H2.

Figure 15:
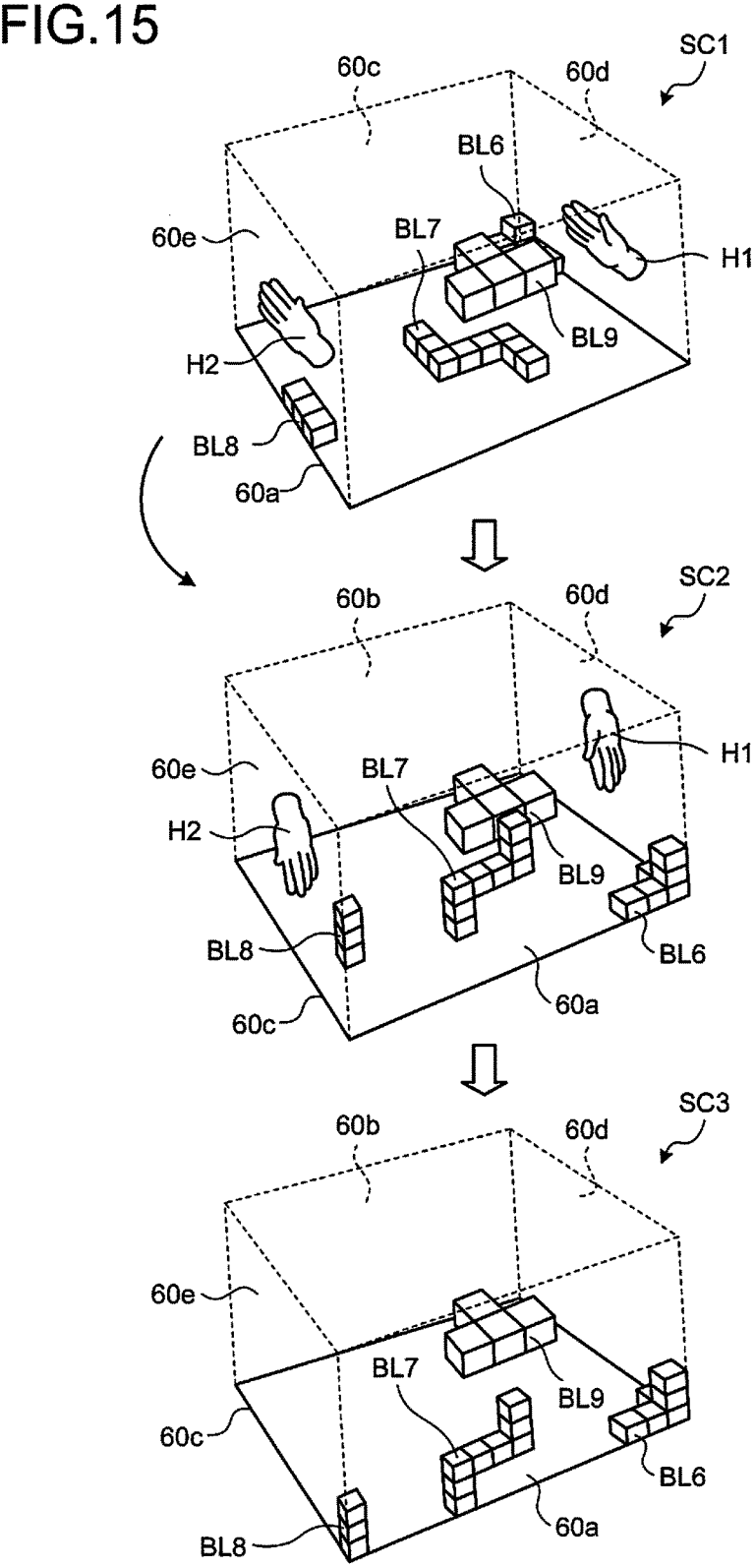
FIG. 15 is a diagram illustrating one of examples of another operation to treat the play region as a three-dimensional object.

FIG. 15 is a diagram illustrating one of examples of another operation to treat the play region 60 as a three-dimensional object. At Step SC1 illustrated in FIG. 15, the three-dimensional blocks BL6 to BL8 are in the stopped state, and the three-dimensional block BL9 is moving. In this scene, when the display device 1 detects the operation of the user holding the play region 60 from the side faces 60d and 60e, and rotating the play region 60 in the vertical direction, the display device 1 rotates the play region 60 in the vertical direction in accordance with the movement of the both hands, as illustrated in Step SC2.

At this time, the display device 1 rotates the three-dimensional blocks in the stopped state together with the play region 60. Then, when the display device 1 detects that the both hands have left the play region 60, the display device 1 moves the three-dimensional blocks in the stopped state toward a new bottom face (the face 60c in this example) as illustrated in Step SC3. When any face of the three-dimensional block in the moving direction comes in contact with the new bottom face or another three-dimensional block in the stopped state, the display device 1 causes the three-dimensional block to be in the stopped state. The control to move the three-dimensional blocks in the stopped state toward the new bottom face may be executed every time the play region 60 is rotated in the vertical direction by 90 degrees.

As described above, by the change of arrangement of the three-dimensional blocks in the stopped state in accordance with the rotation in the vertical direction, the user can dramatically change the overlapping state of the three-dimensional blocks. When rotating the play region 60 in the vertical direction, the display device 1 favorably correct the amount of rotation such that the play region 60 is rotated in units of 90 degrees. When rotating the play region 60 in the vertical direction, the display device 1 may not rotate the moving three-dimensional blocks together with the play region 60.

The user performs the operation to rotate the play region 60 in the vertical direction as follows. As illustrated in Steps SC1 and SC2, first of all, the user arranges the hand H1 to abut on the side face 60d of the play region 60, and arranges the hand H2 to abut on the side face 60e that faces the side face 60d. Then, the user rotates the hand H1 and the hand H2 in the same direction as if there was a rotation axis that connects the center of the side face 60d and the center of the side face 60e, while keeping the interval between the hand H1 and the hand H2.

In the example illustrated in FIG. 15, the display device 1 moves the three-dimensional blocks in the stopped state toward the new bottom face, after rotating the play region 60 in the vertical direction. However, the three-dimensional blocks in the stopped state may be remained to be fixed to the side face. Alternatively, the display device 1 may separate the three-dimensional blocks in the stopped state into elements in section units, and move the elements toward the new bottom face.

Figure 16:
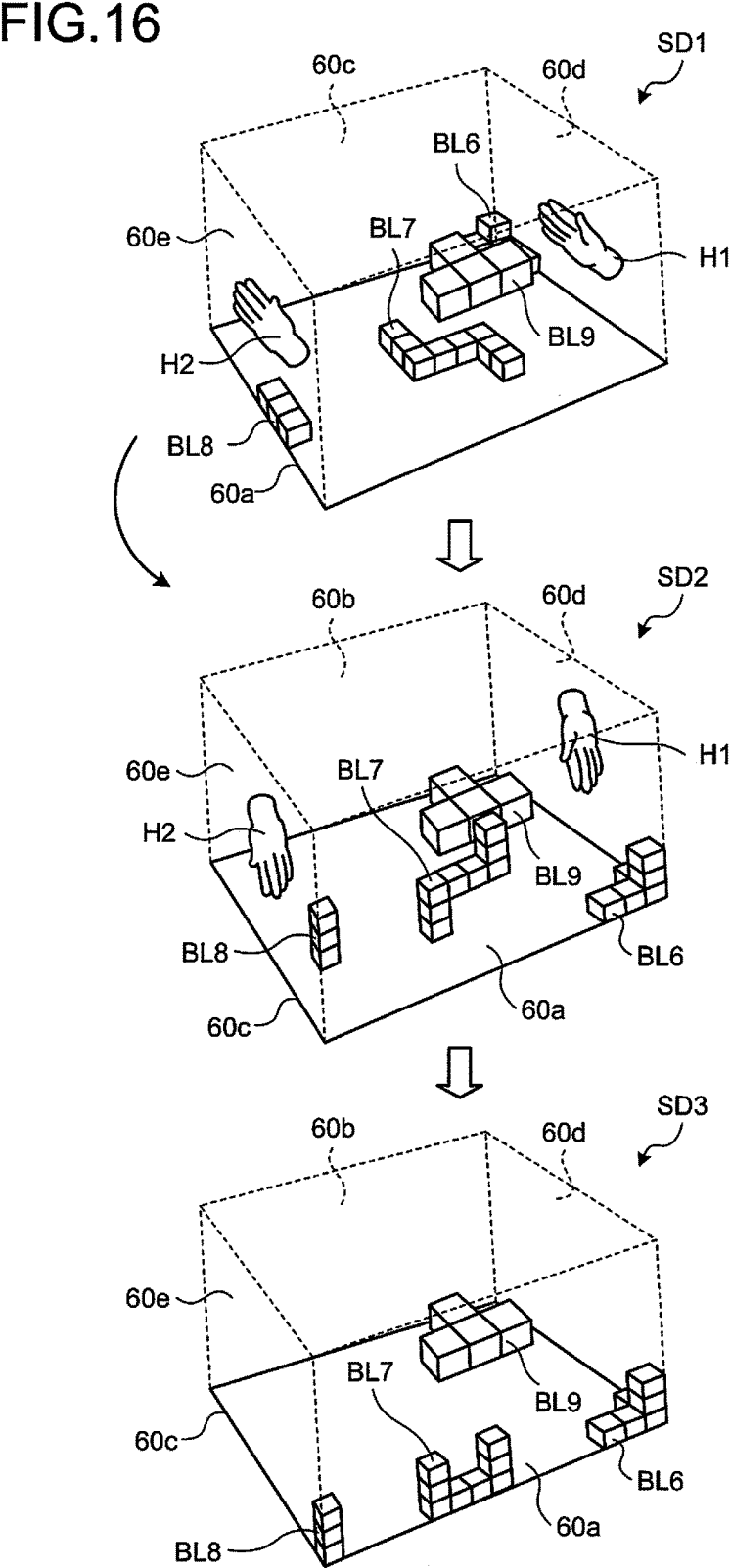
FIG. 16 is a diagram illustrating one of examples of separating three-dimensional blocks in a stopped state into elements in section units, and moving the elements toward a bottom face.

FIG. 16 is a diagram illustrating one of examples of separating the three-dimensional blocks in the stopped state into elements in section units, and moving the elements toward the bottom face. Steps SD1 and SD2 illustrated in FIG. 16 are similar to Steps SC1 and SC2 illustrated in FIG. 15. At Step SD3 illustrated in FIG. 16, the three-dimensional blocks in the stopped state are separated into elements for each section, and thus the shape of the block BL7 is different from that of Step SC3 illustrated in FIG. 15. As described above, the three-dimensional blocks in the stopped state are separated into elements in each section, whereby a layer being in contact with the bottom face is likely to be filled with the elements, and as a result, the user can more easily obtain a higher score.

The display device 1 also accepts an operation to treat a face of the play region 60 as a thin three-dimensional object. FIG. 17 is a diagram illustrating one of examples of an operation to treat a face of the play region 60 as a three-dimensional object. At Step SE1 illustrated in FIG. 17, the three-dimensional blocks BL6 to BL8 are in the stopped state, and the three-dimensional block BL9 is moving. In this scene, when the display device 1 detects an operation of the user holding the bottom face 60a of the play region 60 with the hand and rotating the bottom face 60a in the horizontal direction, the display device 1 rotates the play region 60 in the horizontal direction in accordance with the movement of the hand, as illustrated in Step SE2.

At this time, the display device 1 rotates the three-dimensional blocks in the stopped state together with the play region 60. As described above, by the rotation of the three-dimensional blocks in the stopped state together with the play region 60, the user can see the overlapping state of the three-dimensional blocks from an easily viewable direction. When the operation to rotate the play region 60 in the horizontal direction is detected, the display device 1 may or may not rotate the moving three-dimensional blocks together with the play region 60. The display device may rotate the three-dimensional blocks other than the three-dimensional block held by the user, of the moving three-dimensional blocks, together with the play region 60, without rotating the three-dimensional block held by the user. Further, the display device 1 may correct the amount of rotation such that the play region 60 is rotated in units of 90 degrees.

The user performs the operation to rotate the play region 60 in the horizontal direction as follows. As illustrated in Steps SE1 and SE2, first of all, the user arranges the hand H1 to pick the bottom face 60a of the play region 60 with fingers. Then, the user rotates the hand H1 as if there was a rotation axis in the center of the bottom face 60a.

The display device 1 also accepts an operation to disjoin the three-dimensional block and an operation to join the three-dimensional blocks. FIG. 18 is a diagram illustrating one of examples of an operation to disjoin a three-dimensional block. At Step SF1 illustrated in FIG. 18, the user holds a part of the moving three-dimensional block BL9 with the hand H1, and holds another part thereof with the hand H2. In this scene, when the display device 1 detects an operation of the user to disjoin the three-dimensional block BL9, the display device 1 disjoins the three-dimensional block BL9 into three-dimensional block BL9a and a three-dimensional block BL9b according to the detected operation, as illustrated in Step SF2. When the display device 1 detects that the hands of the user have left the three-dimensional block BL9a and the three-dimensional block BL9b, the display device 1 moves the three-dimensional block BL9a and the three-dimensional block BL9b toward the bottom face.

As described above, the three-dimensional block is disjoined, whereby the user can easily fill a layer of the play region 60. The display device 1 may limit the number of times or the frequency of disjoining the three-dimensional block because the difficulty in playability is decreased if the three-dimensional block can be disjoined without any limit. When a similar operation is detected, the display device 1 may deform the three-dimensional block, instead of disjoining the three-dimensional block.

The user performs the operation to disjoin the three-dimensional block BL9 as follows. As illustrated in Step SF1, first of all, the user arranges the hand H1 to pick a part of the three-dimensional block BL9 with fingers, and arranges the hand H2 to pick another part of the three-dimensional block BL9 with fingers. Then, the user changes angles of the hand H1 and the hand H2 to bend the three-dimensional block BL9, as illustrated in Step SF2. The user may move the hand H1 and the hand H2 in the opposite direction to pull the three-dimensional block BL9 while maintaining the shape of the fingers that hold the three-dimensional block BL9, in order to disjoin the three-dimensional block BL9.

Figure 19:
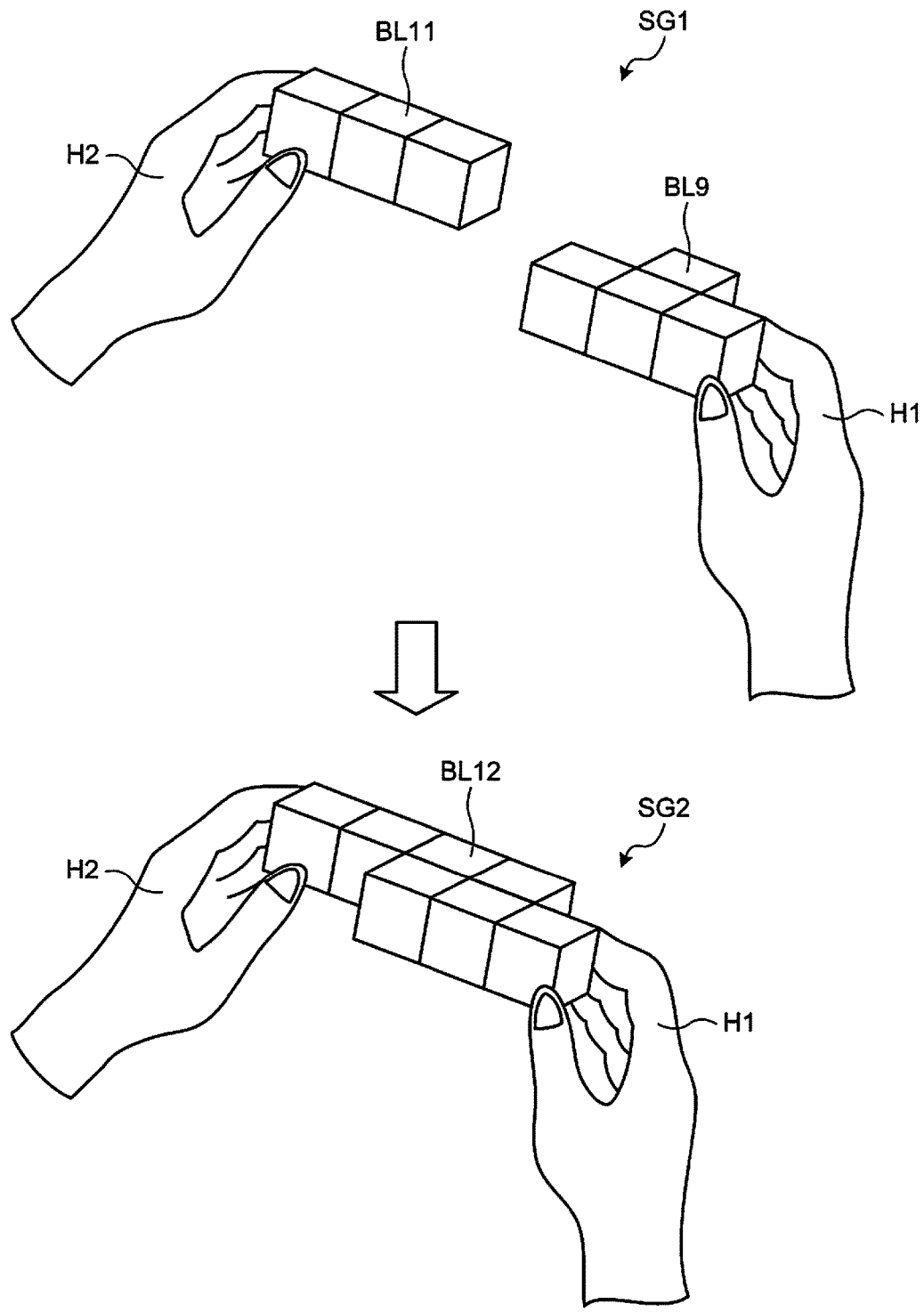
FIG. 19 is a diagram illustrating one of examples of an operation to join three-dimensional blocks.

FIG. 19 is a diagram illustrating one of examples of an operation to join the three-dimensional blocks. At Step SG1 illustrated in FIG. 19, the user holds the moving three-dimensional block BL9 with the hand H1, and holds moving three-dimensional block BL11 with the hand H2. In this scene, when the display device 1 detects an operation of the user bringing the three-dimensional block BL9 in contact with the three-dimensional block BL11, the display device 1 joins the three-dimensional block BL9 and the three-dimensional block BL11 to three-dimensional block BL12, as illustrated in Step SG2. When the display device 1 detects that the hands of the user have left the three-dimensional block BL12, the display device 1 moves the three-dimensional block BL12 toward the bottom face.

The user performs the operation to join the three-dimensional block BL9 and the three-dimensional block BL11 as follows. As illustrated in Step SG1, first of all, the user arranges the hand H1 to pick the three-dimensional block BL9 with fingers, and arranges the hand H2 to pick the three-dimensional block BL11 with fingers. Then, the user moves the hand H1 and the hand H2 such that faces of the three-dimensional block BL9 and faces of the three-dimensional block BL11 to overlap with each other, as illustrated in Step SG2. As a result, the three-dimensional block BL9 and the three-dimensional block BL11 are joined such that the overlapping faces adhere to each other.

Figure 20:
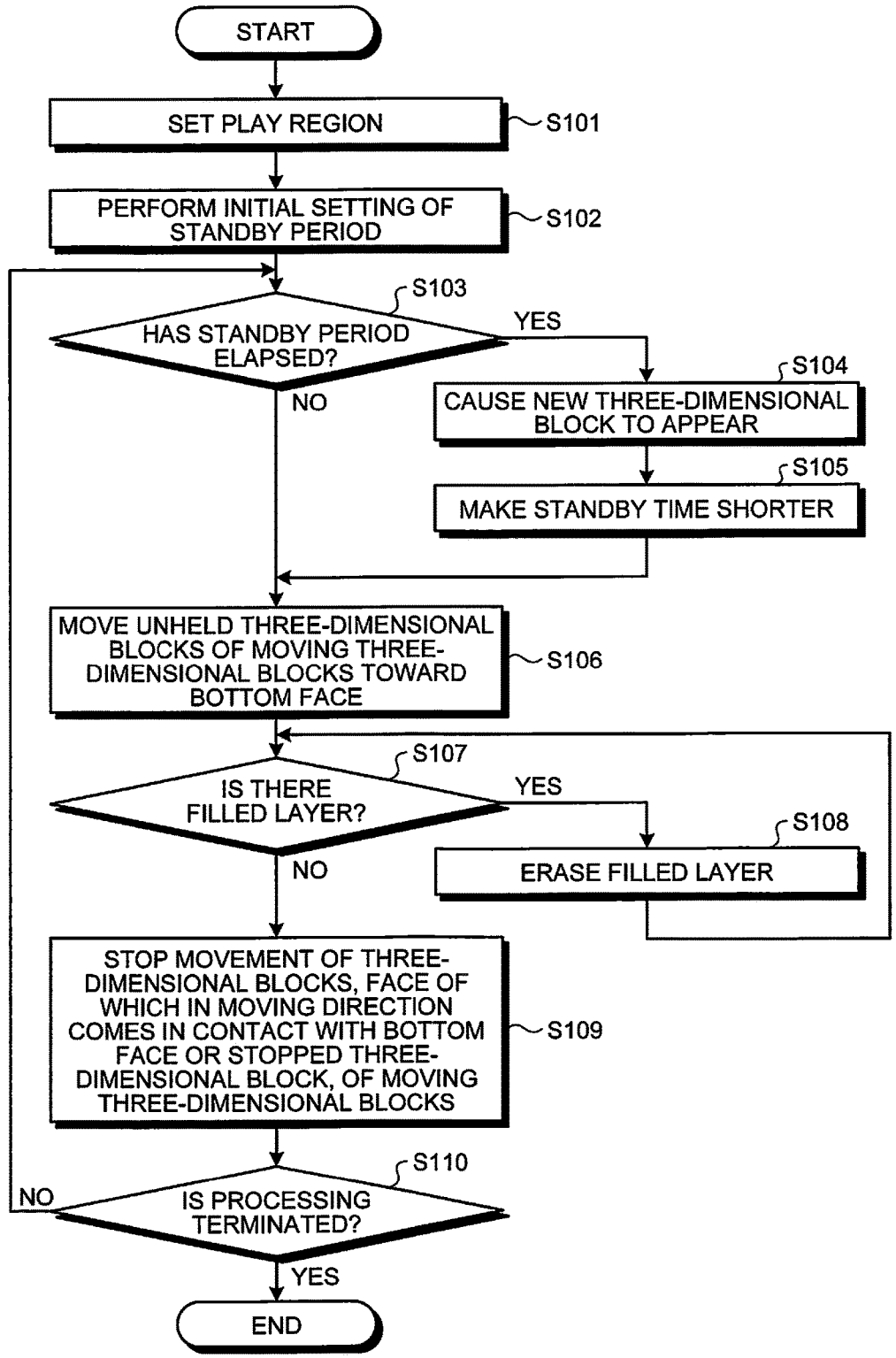
FIG. 20 is a flowchart illustrating a processing procedure of basic processing executed by the display device, in relation to control of a three-dimensional block.

Next, a processing procedure of basic processing executed by the display device 1 in relation to control of the three-dimensional block will be described with reference to FIG. 20. FIG. 20 is a flowchart illustrating a processing procedure of basic processing executed by the display device 1 in relation to control of the three-dimensional block. The processing procedure illustrated in FIG. 20 is realized by the control unit 22 executing the control program 24a.

As illustrated in FIG. 20, first of all, at Step S101, the control unit 22 sets the play region 60. To be specific, the control unit 22 sets the size and the number of sections that configure the play region 60, based on setting data stored and the like in the storage unit 24. Then, at Step S102, the control unit 22 performs initial setting of a standby period.

Following that, at Step S103, the control unit 22 determines whether the standby period has elapsed. When the standby period has never elapsed before, a reference time point to determine whether the standby period has elapsed is a start time point of the processing procedure illustrated in FIG. 20, for example. When the standby period has already elapsed once or more, the reference time point to determine whether the standby period has elapsed is a time point when the previous standby period has elapsed.

When the standby period has elapsed (Yes at Step S103), at Step S104, the control unit 22 causes a new three-dimensional block to appear in the vicinity of the upper face of the play region 60, and starts moving the three-dimensional block to the bottom face. Then, at Step S105, the control unit 22 makes the standby time shorter. When the standby time is shorter, an interval at which a new three-dimensional block appears becomes gradually shorter. When the standby period has not elapsed (No at Step S103), Steps S104 and S105 are not executed.

Following that, at Step S106, the control unit 22 moves the unheld ones of the moving three-dimensional blocks, toward the bottom face of the play region 60. Then, at Step S107, the control unit 22 determines whether there is a layer filled with the elements of the three-dimensional blocks in the play region 60. When there is the filled layer (Yes at Step S107), then at Step S108, the control unit 22 erases the filled layer, and moves the remained portions of the three-dimensional blocks divided by the erasure of the layer, toward the bottom face. Then, the control unit 22 re-executes the determination of Step S107.

When there is no filled layer (No at Step S107), then at Step S109, the control unit 22 stops movement of the three-dimensional blocks, any face of which in the moving direction has come in contact with the bottom face or another stopped three-dimensional block, of the moving three-dimensional blocks. Then, at Step S110, the control unit 22 determines whether terminating the processing. When the user performs a predetermined operation to instruct termination of the processing, and when the three-dimensional blocks pile up to an extent that no new three-dimensional block can be caused to appear, the control unit 22 determines to terminate the processing. When the processing is terminated (Yes at Step S110), the control unit 22 completes the processing procedure. When the processing is not terminated (No at Step S110), the control unit 22 re-executes Step S103 and the subsequent steps.

The display device 1 executes control related to the operation performed by holding a three-dimensional object and control related to the pressing operation, in parallel with the processing procedure illustrated in FIG. 20. Hereinafter, the control related to the operation performed by holding a three-dimensional object will be described with reference to FIGS. 21 to 26. Further, the control related to the pressing operation will be described with reference to FIGS. 27 to 31.

Figure 22:
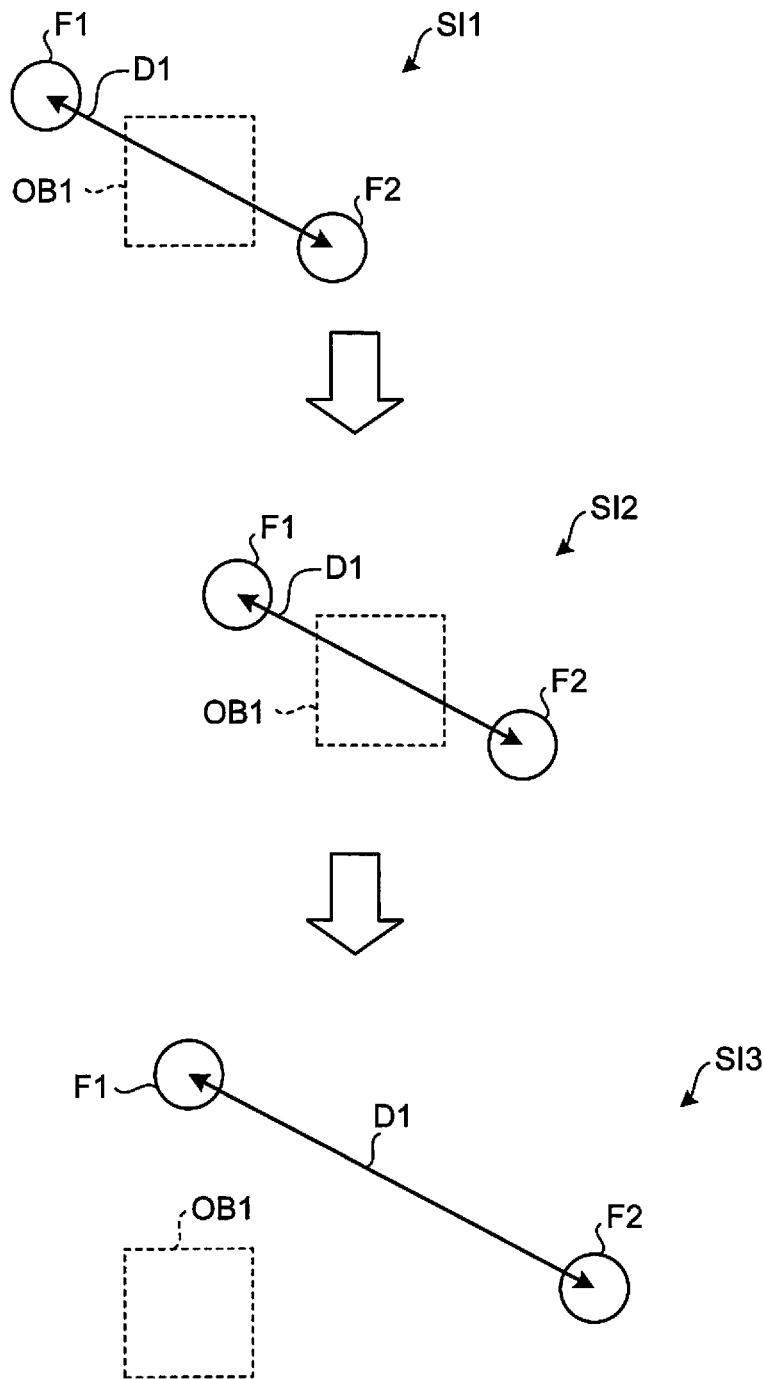
FIG. 22 is a diagram for describing detection of the operation performed by holding the three-dimensional object.

FIGS. 21 and 22 are diagrams for describing detection of the operation performed by holding the three-dimensional object. At Step SH1 illustrated in FIG. 21, a three-dimensional object OB1 is stereoscopically displayed in the display space by the display units 32a and 32b. To select the three-dimensional object OB1, the user moves a finger F1 and a finger F2 such that the three-dimensional object OB1 is positioned between the finger F1 and the finger F2.

When two bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 has been in the selected state, by changing a display style of the three-dimensional object OB1, or the like.

The two bodies do not necessarily stay at the positions where the two bodies sandwich the three-dimensional object OB1, while the display device 1 is monitoring the change of the distance between the two bodies. That is, as illustrated at Step SH1, after the user moves the finger F1 and the finger F2 such that the three-dimensional object OB1 is positioned between the finger F1 and the finger F2, the user can move the finger F1 and the finger F2 to other positions without keeping the state of the finger F1 and the finger F2.

Assume that the user has moved the finger F1 and the finger F2 from the state of Step SH1 while keeping a distance D1 between the finger F1 and the finger F2 substantially constant, as illustrated at Step SH2. In this case, the display device 1 applies change, such as movement, or rotation, to the three-dimensional object OB1, according to movement of the finger F1 and the finger F2, from a stage where it is detected that the three-dimensional object OB1 is displayed between the finger F1 and the finger F2, that is, from a stage of Step SH1. Then, as illustrated at Step SH3, the display device 1 causes the three-dimensional object OB1 to be in the selected state, at a stage where the state in which the distance D1 between the finger F1 and the finger F2 is kept substantially constant is continued for a predetermined time or more.

As illustrated in Steps SI1 to SI3 of FIG. 22, when the distance D1 between the finger F1 and the finger F2 is enlarged before the predetermined time elapses, that is, when selection has not been performed, the display device 1 applies reverse change to the change that had been applied to the three-dimensional object OB1 by that time, to the three-dimensional object OB1. As a result, the three-dimensional object OB1 is displayed at the same position in the same state as the stage of Step SI1. The speed to apply the reverse change to the three-dimensional object OB1 may be faster than the speed at which the change had been applied to the three-dimensional object OB1 by that time. That is, the display device 1 may reversely change the three-dimensional object OB1 as if the three-dimensional object OB1 was reversely reproduced at a high speed.

As described above, the display device 1 starts applying the change to the three-dimensional object from the stage where it is detected that the three-dimensional object is displayed between the two bodies, whereby the user can recognize that the three-dimensional object is getting selected, before the selection is determined. As a result, the user can recognize whether the intended three-dimensional object has been selected, at an early stage. The display device 1 may display the three-dimensional object, to which the change is applied, in a form (for example, translucent) different from a normal time and from the selected state until the state in which the distance between the two bodies is kept substantially constant is continued for the predetermined time or more, so that the user can easily discriminate the state of the three-dimensional object.

The display device 1 may start changing the three-dimensional object OB1 after the three-dimensional object OB1 is in the selected state, instead of changing the three-dimensional object OB1 according to the movement of the finger F1 and the finger F2 from the stage of Step SH1. Alternatively, the display device 1 may cause the three-dimensional object OB1 to be in the selected state only when the state in which the three-dimensional object OB1 is positioned between the finger F1 and the finger F2 is continued for a predetermined time or more, as illustrated in Step SH1.

Figure 23:
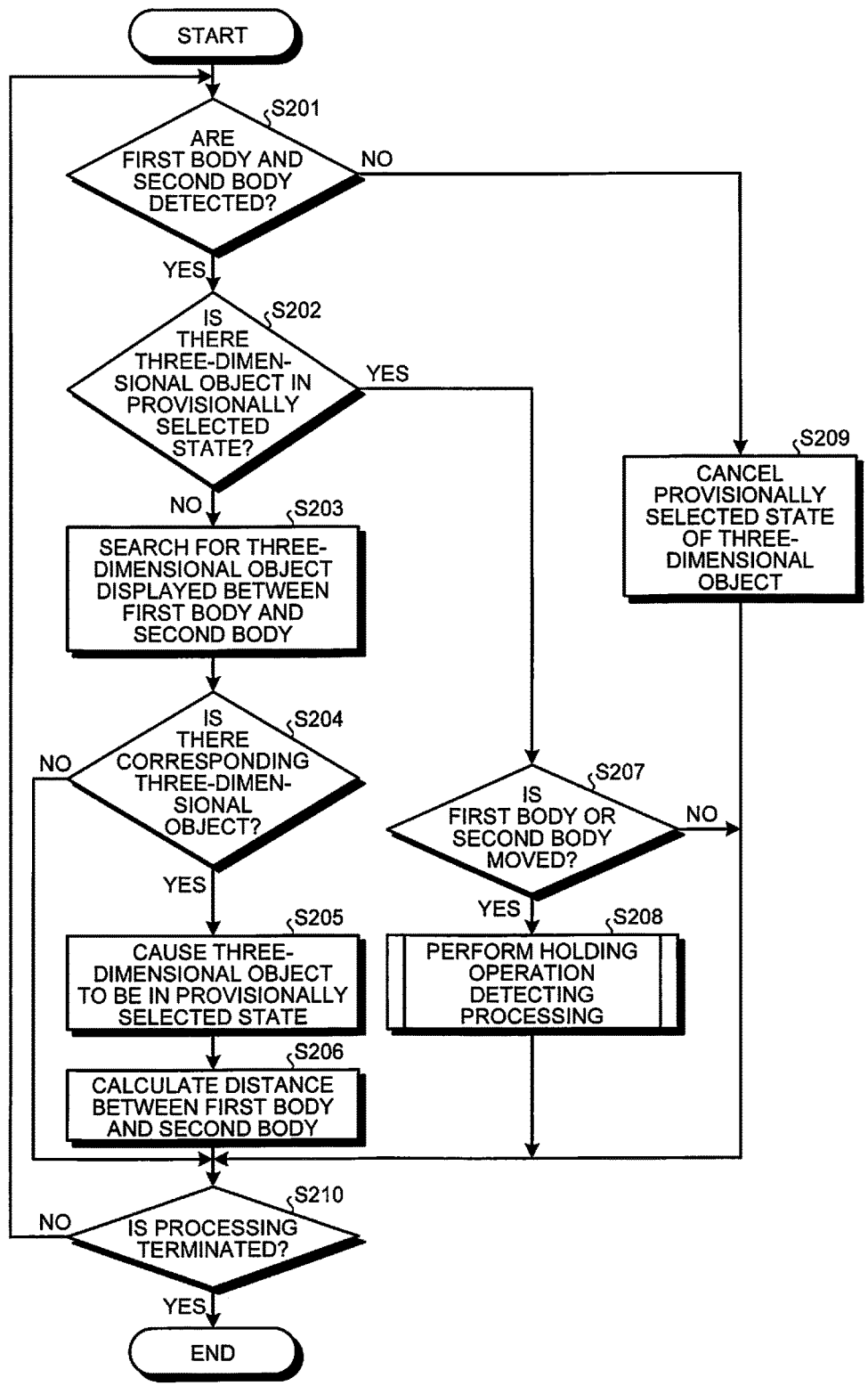
FIG. 23 is a flowchart illustrating a processing procedure of selection detecting processing of the three-dimensional object.

FIG. 23 is a flowchart illustrating a processing procedure of selection detecting processing of the three-dimensional object. The processing procedure illustrated in FIG. 23 is realized by the control unit 22 executing the control program 24a. At Step S201 as illustrated in FIG. 23, the control unit 22 determines whether the first body and the second body have been detected by the detection unit 44, that is, by the imaging units 40 and 42. When the first body and the second body have not been detected (No at Step S201), then at Step S209, if there is a three-dimensional object in a provisionally selected state, the control unit 22 cancels the provisionally selected state of the three-dimensional object.

Then, at Step S210, the control unit 22 determines whether terminating the processing. When terminating the processing (Yes at Step S210), the control unit 22 terminates the processing procedure. When not terminating the processing (No at Step S210), the control unit 22 re-executes Step S201 and the subsequent steps.

When the first body and the second body have been detected (Yes at Step S201), then at Step S202, the control unit 22 determines whether there is a three-dimensional object in the provisionally selected state. When there is no three-dimensional object in the provisionally selected state (No at Step S202), then at Step S203, the control unit 22 searches displayed three-dimensional objects for a three-dimensional object displayed between the first body and the second body. When there is no corresponding three-dimensional object (No at Step S204), the control unit 22 executes Step S210.

When the three-dimensional object displayed between the first body and the second body is found (Yes at Step S204), then at Step S205, the control unit 22 causes the three-dimensional object displayed between the first body and the second body to be in the provisionally selected state. At Step S206, the control unit 22 calculates the distance between the first body and the second body. Then, the control unit 22 executes Step S210.

When the first body and the second body have been detected, and there is the three-dimensional object in the provisionally selected state (Yes at Step S202), then at Step S207, the control unit 22 determines whether at least one of the first body and the second body is being moved. When both of the first body and the second body are not being moved (No at Step S207), the control unit 22 executes Step S210.

Figure 24:
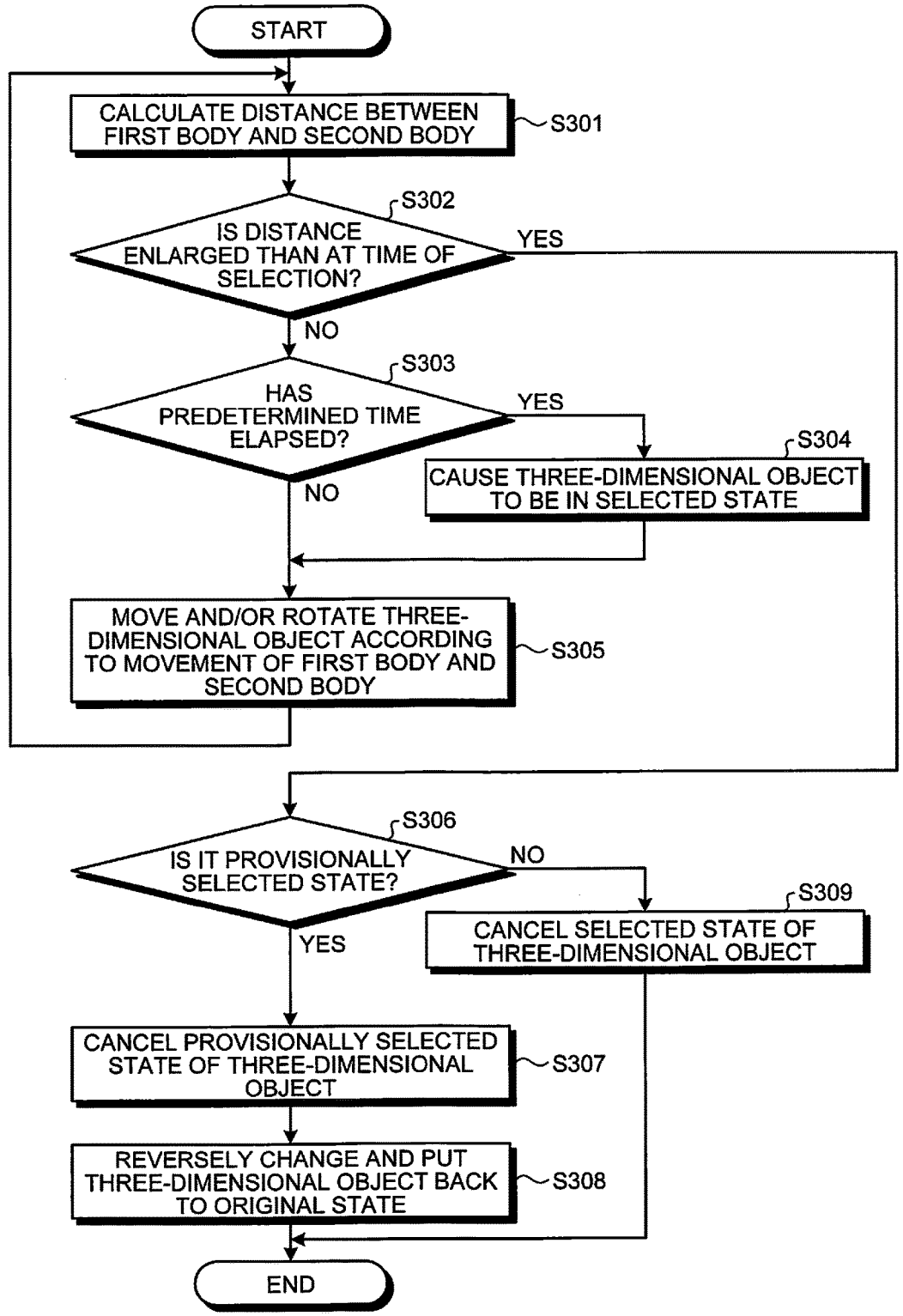
FIG. 24 is a flowchart illustrating a processing procedure of a holding operation detecting processing.

When at least one of the first body and the second body is being moved (Yes at Step S207), then at Step S208, the control unit 22 executes the holding operation detecting processing illustrated in FIG. 24, and in the processing, changes the three-dimensional object in the selected state, according to the detected operation. After the holding operation detecting processing is completed, the control unit 22 executes Step S210.

FIG. 24 is a flowchart illustrating a processing procedure of the holding operation detecting processing. The processing procedure illustrated in FIG. 24 is realized by the control unit 22 executing the control program 24a. As illustrated in FIG. 24, first of all, at Step S301, the control unit 22 calculates the distance between the first body and the second body. Then, at Step S302, the control unit 22 determines whether the distance between the first body and the second body on and after the start time point of the holding operation detecting processing is enlarged.

When the distance between the first body and the second body is kept substantially constant (No at Step S302), then at Step S303, the control unit 22 determines whether a predetermined time has elapsed after the holding operation detecting processing is started. When the predetermined time has elapsed (Yes at Step S303), then at Step S304, if there is a three-dimensional object in the provisionally selected state, the control unit 22 causes the three-dimensional object to be in the selected state. When the predetermined time has not elapsed (No at Step S303), Step S304 is not executed.

Following that, at Step S305, the control unit 22 moves and/or rotates the three-dimensional object according to the movement of the detected first body and second body. For example, when the first body and the second body are hands, and the held three-dimensional object is the play region 60, the control unit 22 applies change as illustrated in FIGS. 14 to 17 to the play region 60, according to the movement of the first body and the second body. When the first body and the second body are fingers, and the held three-dimensional object is a three-dimensional block, the control unit 22 applies change as illustrated in FIGS. 11, 13, 18, and 19 to the three-dimensional block. Then, the control unit 22 re-executes Step S301 and the subsequent steps.

When the distance between the first body and the second body is enlarged (Yes at Step S302), then at Step S306, the control unit 22 determines whether the three-dimensional object displayed between the first body and the second body is in the provisionally selected state.

When the three-dimensional object is in the provisionally selected state (Yes at Step S306), then at Step S307, the control unit 22 cancels the provisionally selected state of the three-dimensional object. Then, at Step S308, the control unit 22 reversely changes and puts the three-dimensional object back in the original state. Then, the control unit 22 terminates the holding operation detecting processing.

When the three-dimensional object is not in the provisionally selected state, that is, when the three-dimensional object is in the selected state (No at Step S306), then at Step S309, the control unit 22 cancels the selected state of the three-dimensional object. Then, the control unit 22 terminates the holding operation detecting processing.

Figure 25:
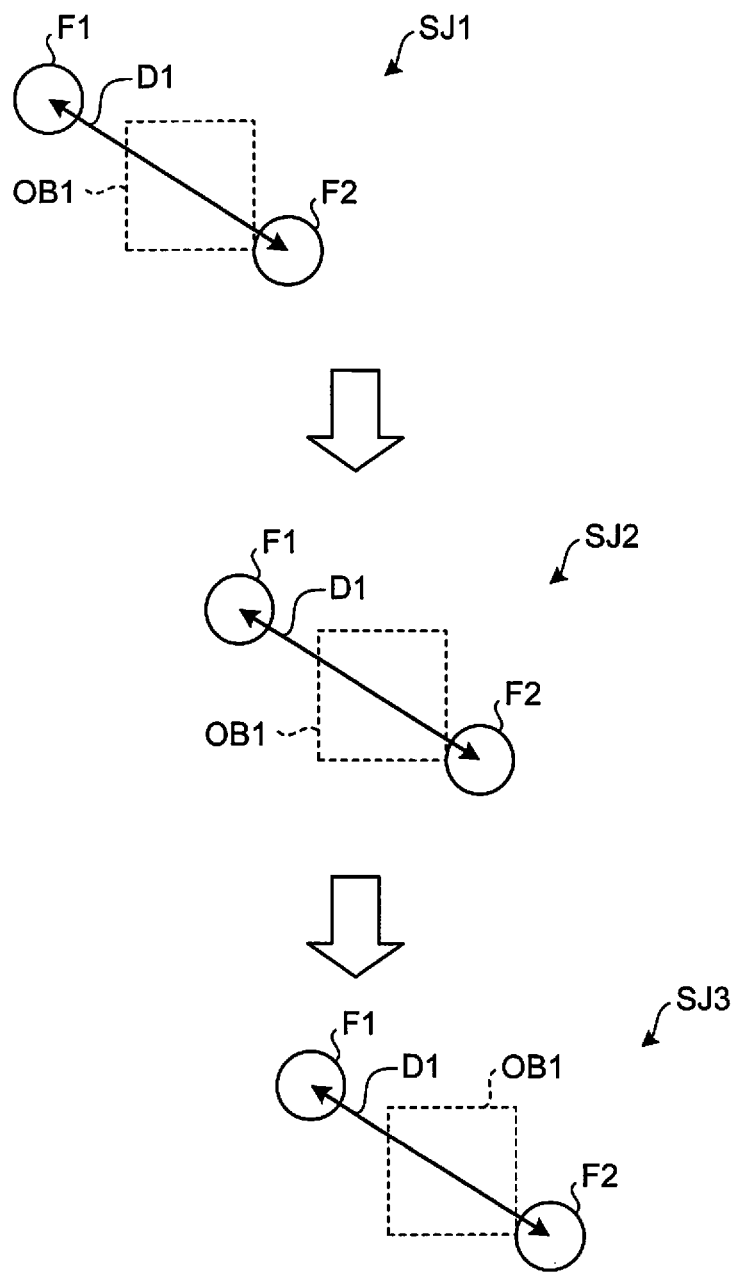
FIG. 25 is a diagram for describing detection of another operation performed by holding the three-dimensional object.

As illustrated in Steps SJ1 to SJ3 illustrated in FIG. 25, maintenance of the distance between the first body and the second body substantially constant for a predetermined time or more after at least one of the first body and the second body comes in contact with the three-dimensional object may be employed as one of conditions to select the three-dimensional object. When the contact with the three-dimensional object is employed as one of conditions, the user can easily select a desired three-dimensional object when a plurality of three-dimensional objects is closely displayed.

Figure 26:
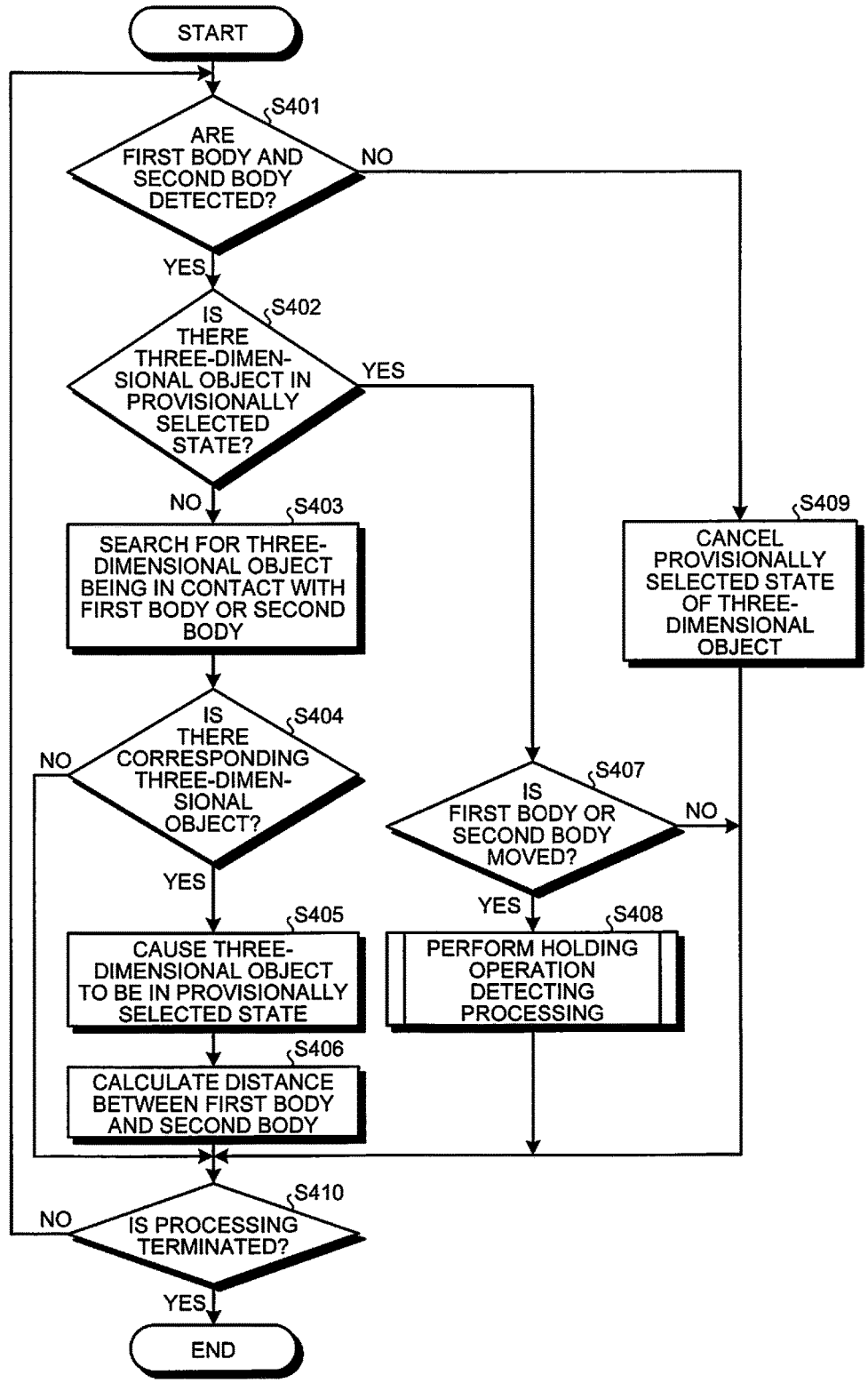
FIG. 26 is a flowchart illustrating a processing procedure of the selection detecting processing of when contact with the three-dimensional object is employed as one of conditions of selection.

FIG. 26 is a flowchart illustrating a processing procedure of selection detecting processing of when the contact with the three-dimensional object is employed as one of conditions of selection. As illustrated in FIG. 26, at Step S401, the control unit 22 determines whether the first body and the second body have been detected by the detection unit 44, that is, by the imaging units 40 and 42. When the first body and the second body have not been detected (No at Step S401), then at Step S409, if there is a three-dimensional object in a provisionally selected state, the control unit 22 cancels the provisionally selected state of the three-dimensional object.

Then, at Step S410, the control unit 22 determines whether terminating the processing. When terminating the processing (Yes at Step S410), the control unit 22 completes the processing procedure. When not terminating the processing (No at Step S410), the control unit 22 re-executes Step S401 and the subsequent steps.

When the first body and the second body have been detected (Yes at Step S401), then at Step S402, the control unit 22 determines whether there is a three-dimensional object in the provisionally selected state. When there is no three-dimensional object in the provisionally selected state (No at Step S402), then at Step S403, the control unit 22 searches displayed three-dimensional objects for a three-dimensional object being in contact with at least one of the first body or the second body. When there is no corresponding three-dimensional object (No at Step S404), the control unit 22 executes Step S410.

When the three-dimensional object being in contact with at least one of the first body and the second body has been found (Yes at Step S404), then at Step S405, the control unit 22 causes the three-dimensional object displayed between the first body and the second body to be in the provisionally selected state. Further, at Step S406, the control unit 22 calculates the distance between the first body and the second body. Then, the control unit 22 executes Step S410.

When the first body and the second body have been detected, and there is the three-dimensional object in the provisionally selected state (Yes at Step S402), then at Step S407, the control unit 22 determines whether at least one of the first body and the second body is being moved. When both of the first body and the second body are not being moved (No at Step S407), the control unit 22 executes Step S410.

When at least one of the first body and the second body is being moved (Yes at Step S407), then at Step S408, the control unit 22 executes the holding operation detecting processing illustrated in FIG. 24, and in the processing, changes the three-dimensional object in the selected state, according to the detected operation. After the holding operation detecting processing is terminated, the control unit 22 executes Step S410.

FIG. 27 is a diagram illustrating one of examples of information stored in the acting data 24c. As illustrated in FIG. 27, change of the three-dimensional object of when a pressing operation is detected differs depending presence of a fulcrum, presence of an obstacle in the direction of pressing, and a speed of pressing. The obstacle referred to here corresponds to any of the faces of the play region 60 and other three-dimensional objects. Whether the speed of pressing is fast or slow is determined based on a threshold.

When there is no fulcrum in the three-dimensional object, and no obstacle in the direction of pressing, the three-dimensional object is displayed in such a manner as to be moved in the direction of pressing according to an amount of pressing. Whether the three-dimensional object is moved together with a pressing body, or the three-dimensional object is moved away from the pressing body such that the three-dimensional object is flicked by the pressing body may be determined based on the speed of pressing, for example.

When there is no fulcrum in the three-dimensional object, and there is a fixed obstacle like a stopped three-dimensional block or a face of the play region 60 in the direction of pressing, the three-dimensional object is displayed in such a manner as to be moved in the direction of pressing according to the amount of pressing, and to stop the movement at the time point of coming in contact with the obstacle. When the speed of pressing is fast, the three-dimensional object may destroy the obstacle and continue the movement. When the three-dimensional object comes in contact with the obstacle while being moved away from the pressing body such that the three-dimensional object is flicked by the pressing body, the three-dimensional object may be moved in the reverse direction such that the three-dimensional object rebounds.

When there is no fulcrum in the three-dimensional object, there is another unfixed obstacle of a moving three-dimensional block in the direction of pressing, and the speed of pressing is slow, the three-dimensional object is displayed in such a manner as to be moved in the direction of pressing according to the amount of pressing, and to be moved together with the obstacle after coming in contact with the obstacle. When there is no fulcrum in the three-dimensional object, there is another unfixed obstacle of a moving three-dimensional block in the direction of pressing, and the speed of pressing is fast, the three-dimensional object is displayed in such a manner as to be moved in the direction of pressing according to the amount of pressing. Then, after the three-dimensional object comes in contact with the obstacle, the obstacle is displayed in such a manner as to be flicked and to be moved. After coming in contact with the obstacle, the three-dimensional object may be stopped on site, or may reduce the speed and continue the movement.

When there is a fulcrum in the three-dimensional object, the three-dimensional object is displayed in such a manner as to be rotated around the fulcrum according to the amount and the direction of pressing. The rotation referred to here may be rotation of 360 degrees, or may be rotation reciprocating within a predetermined rotation range.

Figure 28:
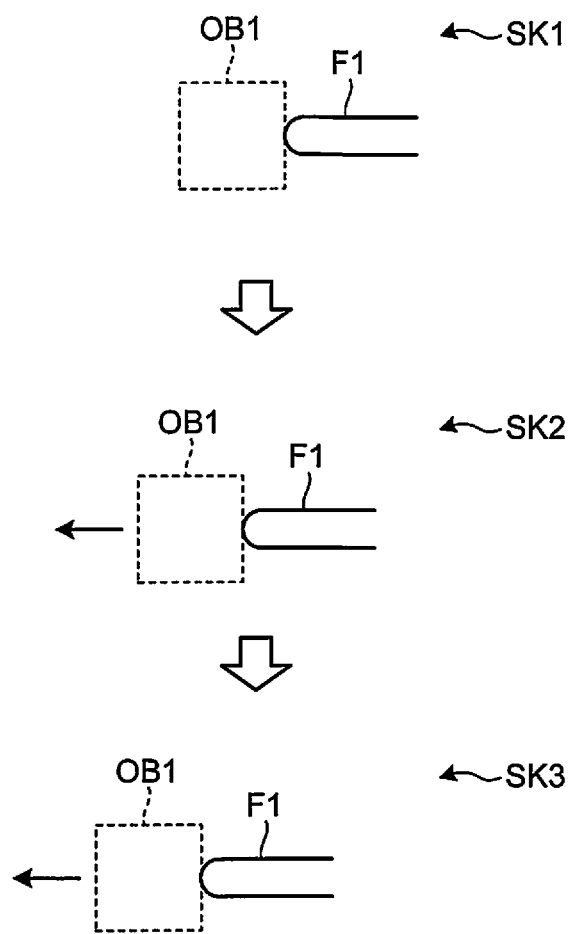
FIG. 28 is a diagram for describing detection of an operation to press the three-dimensional object.
Figure 29:
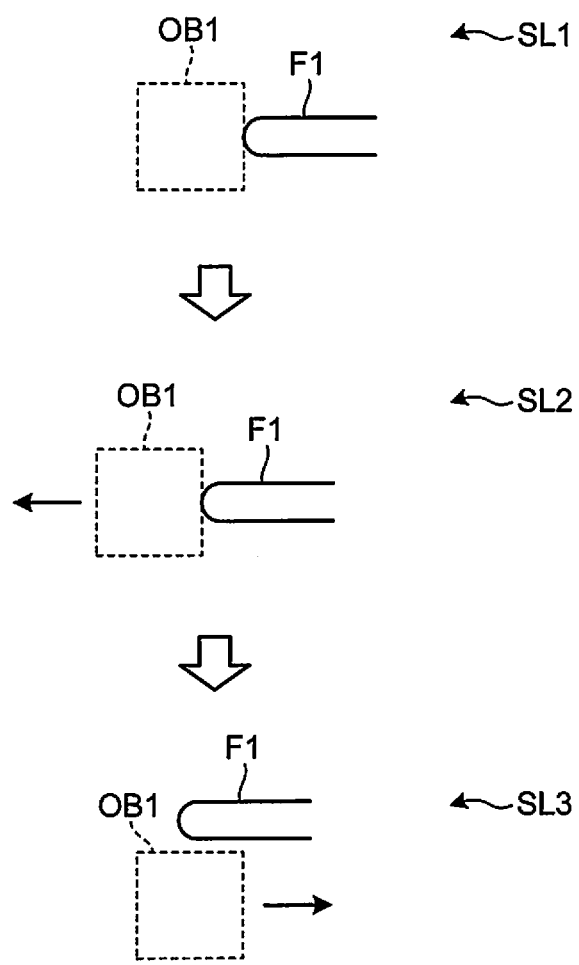
FIG. 29 is a diagram for describing detection of the operation to press the three-dimensional object.

FIGS. 28 and 29 are diagrams for describing detection of the operation to press the three-dimensional object. At Step SK1 illustrated in FIG. 28, the three-dimensional object OB1 is stereoscopically displayed in the display space by the display units 32a and 32b. Further, the user brings the finger F1 in contact with the three-dimensional object OB1.

Assume that the user enters the finger F1 into an inside of the three-dimensional object OB1. When it is detected that the body that is in contact with the three-dimensional object OB1 has been moved to the inside of the three-dimensional object OB1, as illustrated in Step SK2, the display device 1 changes the three-dimensional object OB1 from the time point, according to the operation with the finger F1. In the example illustrated in FIG. 28, at Step SK2, the three-dimensional object OB1 starts movement in accordance with the movement of the finger F1.

Then, as illustrated in Step SK3, the display device 1 determines the three-dimensional object OB1 as the object to be operated, at a stage where the movement of the finger F1 to the inside of the three-dimensional object OB1 is continued for a predetermined time or more. Then, the display device 1 notifies the user of the fact that the three-dimensional object OB1 has been determined as the object to be operated, by changing the display style of the three-dimensional object OB1, or the like. The display device 1 still continues to change the three-dimensional object OB1 while the movement of the finger F1 to the inside of the three-dimensional object OB1 is detected.

As illustrated in Step SL3 of FIG. 29, when the movement of the finger F1 to the inside of the three-dimensional object OB1 has not been detected before a predetermined time elapses, the display device 1 applies reverse change to the change that had been applied to the three-dimensional object OB1 by that time, to the three-dimensional object OB1. As a result, the three-dimensional object OB1 is displayed at the same position in the same state as the stage of Step SK1 (Step SL1). The speed to apply the reverse change to the three-dimensional object OB1 may be faster than the speed at which the change had been applied to the three-dimensional object OB1 by that time. That is, the display device 1 may reversely change the three-dimensional object OB1 as if the display device 1 reversely reproduced the three-dimensional object OB1 at a high speed.

As described above, the display device 1 starts applying the change to the three-dimensional object at the stage where it is detected that the body enters into the inside of the three-dimensional object, whereby the user can recognize the three-dimensional object is getting selected before the selection is determined. As a result, the user can get to know whether an intended three-dimensional object has been selected, at an early stage. When an unintended three-dimensional object has been selected, the user can put the selected unintended three-dimensional object back in an original state, by canceling the operation before the predetermined time passes.

The three-dimensional object, to which the change is applied, may be displayed in a form (for example, translucent) different from a normal time or from a state in which the selection as the object to be operated has been determined, until the movement of the finger F1 to the inside of the three-dimensional object OB1 is continued for a predetermined time or more. By the change of the display style in such a manner, the user can easily discriminate the state of the three-dimensional object.

The display device 1 may start changing the three-dimensional object OB1 after the three-dimensional object OB1 is in the selected state, instead of changing the three-dimensional object OB1 according to the movement of the finger F1 at the state of Step SK1. Alternatively, the display device 1 may determine the three-dimensional object OB1 as the object to be operated, only when the state in which the finger F1 is in contact with the three-dimensional object OB1 is continued for a predetermined time or more, like Step SK1.

Figure 30:
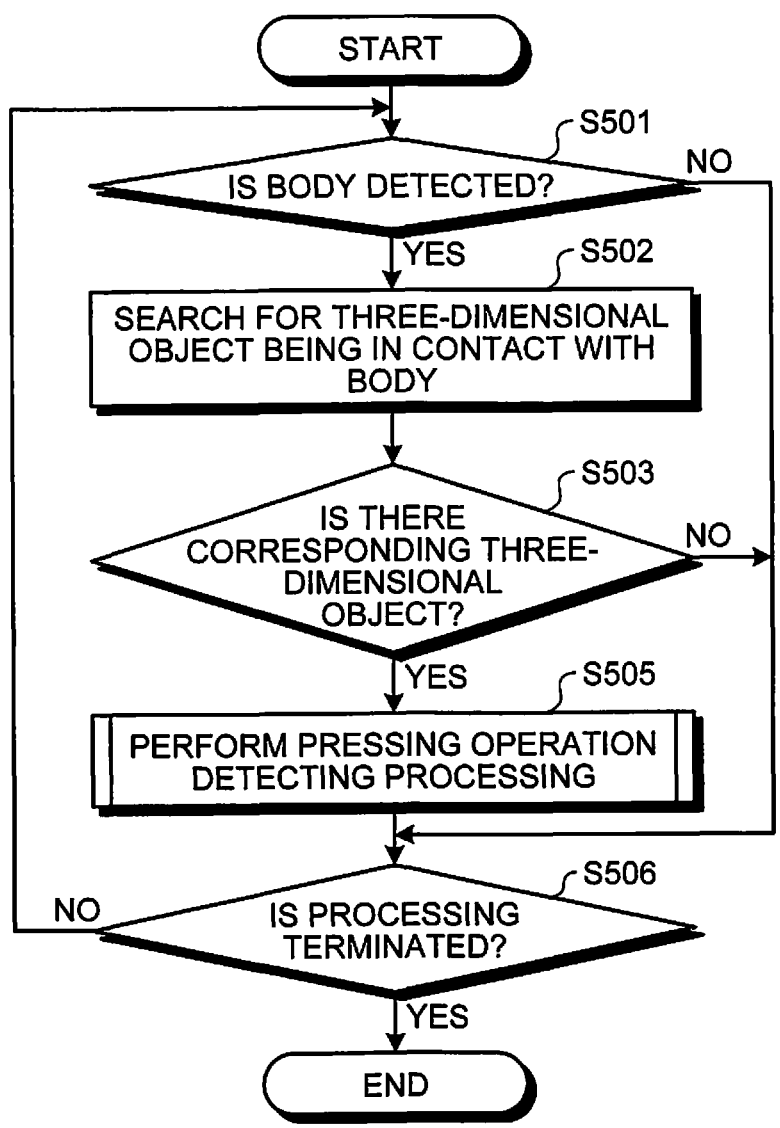
FIG. 30 is a flowchart illustrating a processing procedure of contact detecting processing of the three-dimensional object.

FIG. 30 is a flowchart illustrating a processing procedure of contact detecting processing of the three-dimensional object. The processing procedure illustrated in FIG. 30 is realized by the control unit 22 executing the control program 24a.

As illustrated in FIG. 30, first of all, at Step S501, the control unit 22 determines whether a predetermined body has been detected by the detection unit 44, that is, by the imaging units 40 and 42. The predetermined body is, for example, a finger of the user. When the predetermined body has not been detected (No at Step S501), then at Step S506, the control unit 22 determines whether terminating the processing. When terminating the processing (Yes at Step S506), the control unit 22 completes the processing procedure. When not terminating the processing (No at Step S506), the control unit 22 re-executes Step S501 and the subsequent steps.

When the predetermined body has been detected (Yes at Step S501), then at Step S502, the control unit 22 searches for a three-dimensional object being in contact with the predetermined body. When there is not three-dimensional object being in contact with the predetermined body (No at Step S503), the control unit 22 executes Step S506.

Figure 31:
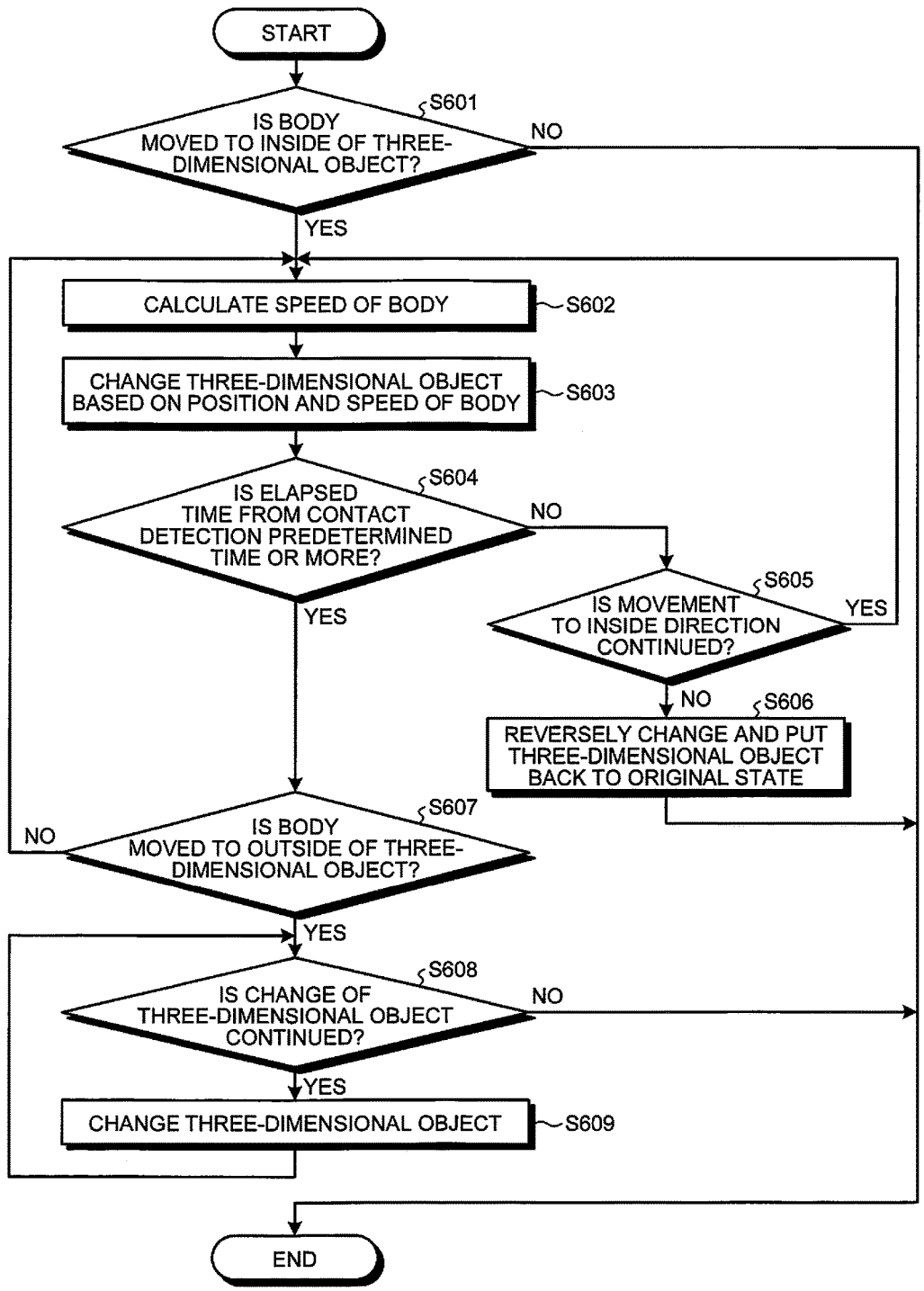
FIG. 31 is a flowchart illustrating a processing procedure of a pressing operation detecting processing.

When the three-dimensional object being in contact with the predetermined body has been found (Yes at Step S503), then at Step S505, the control unit 22 executes pressing operation detecting processing illustrated in FIG. 31. Following that, the control unit 22 executes Step S506.

FIG. 31 is a flowchart illustrating a processing procedure of the pressing operation detecting processing. The processing procedure illustrated in FIG. 31 is realized by the control unit 22 executing the control program 24a. As illustrated in FIG. 31, first of all, at Step S601, the control unit 22 determines whether the predetermined body is moving to an inside of the three-dimensional object. When the predetermined body is not moving to the inside of the three-dimensional object (No at Step S601), the three-dimensional object is determined not to be the object to be operated, and thus the control unit 22 terminates the pressing operation detecting processing.

When the predetermined body is moving to the inside of the three-dimensional object (Yes at Step S601), then at Step S602, the control unit 22 calculates the speed of the predetermined body. Then, at Step S603, the control unit 22 changes the three-dimensional object based on the position, the speed, and the like of the predetermined body. A specific way of changing the three-dimensional object is determined according to the acting data 24c.

Following that, at Step S604, the control unit 22 determines whether an elapsed time from the contact detection is a predetermined time or more. When the elapsed time is shorter than the predetermined time, that is, when the three-dimensional object has not been determined as the object of the pressing operation (No at Step S604), then at Step S605, the control unit 22 determines whether the movement of the predetermined body to the inside of the three-dimensional object is continued.

When the movement to the inside of the three-dimensional object is continued (Yes at Step S605), the control unit 22 re-executes Step S602 and the subsequent steps. When the movement to the inside of the three-dimensional object is not continued (No at Step S605), then at Step S606, the control unit 22 reversely changes and puts the three-dimensional object back in the original state. Then, the control unit 22 terminates the pressing operation detecting processing.

When the elapsed time from the contact detection is the predetermined time or more (Yes at Step S604), then at Step S607, the control unit 22 determines whether the predetermined body has been moved to an outside of the three-dimensional object. When the predetermined body has not been moved to the outside of the three-dimensional object, that is, when the pressing operation is continued (No at Step S607), the control unit 22 re-executes Step S602 and the subsequent steps.

When the predetermined body has been moved to the outside of the three-dimensional object, that is, when the three-dimensional object has been released (Yes at Step S607), then at Step S608, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step S608), then at Step S609, the control unit 22 changes the three-dimensional object, and re-executes Step S608 and the subsequent steps. When the change of the three-dimensional object is not continued (No at Step S608), the control unit 22 terminates the pressing operation detecting processing.

The forms of the present invention described in the above-described embodiments can be arbitrarily changed without departing from the gist of the present invention. For example, the control program 24a described in the above embodiments may be divided into a plurality of modules, or may be integrated with another program. In the above embodiments, the fingers and the hands are used to perform an operation to the three-dimensional object. However, a something shaped like a stick may be used, instead of the hands and fingers.

In the above-described embodiments, the display device detects the operation to the three-dimensional object by itself. However, the display device may detect the operation to the three-dimensional object in cooperation with a server. In this case, the display device successively transmits information detected by the detection unit to the server, and the server detects the operation and notifies the display device of the detection result. With such a configuration, the load of the display device can be reduced.

The invention claimed is:

1. A display device, comprising:
a display configured to stereoscopically display a plurality of three-dimensional blocks each including one or a plurality of elements each element occupying one of divided sections in a virtual play region divided in a three-dimensional matrix manner in a display space, by displaying images respectively corresponding to both eyes of a user by being worn;
a controller configured to control the display; and
a detector configured to detect a position of a body in the display space, wherein
the controller controls the display
to cause a movable three-dimensional block to appear from an upper face of the virtual play region,
to move the movable three-dimensional block from the upper face toward a bottom face that faces the upper face in the virtual play region,
to move, when change of the body with time in the display space is detected by the detector, the movable three-dimensional block in section units based on a result of the detecting, and
to erase, when all sections of one layer in the virtual play region are filled with elements of the plurality of three-dimensional blocks and the movable three-dimensional block due to movement of the movable three-dimensional block, the elements, wherein the layer includes all of the sections which have a same distance from the bottom face of the virtual play region, and
to move the movable three-dimensional blocks in the virtual play region toward a new bottom face that faces the new upper face in the virtual play region, when the virtual play region is rotated in the vertical direction in such a manner that the upper face changes to a new upper face which is one of a plurality of faces of the virtual play region, wherein the new upper face is a different face from the upper face before the rotation.

2. The display device according to claim 1, wherein the controller is configured to perform control such that, after one movable three-dimensional block appears, a next movable three-dimensional block appears after a predetermined time.

3. The display device according to claim 2, wherein the controller is configured to make an interval at which the movable three-dimensional block appears shorter as time passes.

4. The display device according to claim 1, wherein the controller is configured to perform control such that the movable three-dimensional block is moved from a first face of the virtual play region toward a second face that faces the first face, with lapse of time.

5. The display device according to claim 4, wherein the controller is configured to control the movable three-dimensional block not to be moved to the first face, even when the detector detects movement of the body from the second face to the first face.

6. The display device according to claim 4, wherein the controller is configured to
control a first movable three-dimensional block not to be moved regardless of the detection result of the detector when at least one of faces of the first three-dimensional block reaches the second face, and
control a second movable three-dimensional block not to be moved regardless of the detection result of the detector when at least one of faces of the second three-dimensional block reaches a section where the first three-dimensional block exists.

7. The display device according to claim 6, wherein the controller is configured to move the first movable three-dimensional block and the second movable three-dimensional block within a predetermined condition.

8. The display device according to claim 7, wherein the controller is configured to,
when the detector detects movement of the body within a predetermined time from when at least one of faces of the first three-dimensional block reaches the second face,
move the first three-dimensional block based on a detection result of the detector, and,
when the detector detects movement of the body within a predetermined time from when at least one of faces of the second three-dimensional block reaches a section where the first three-dimensional block exists,
move the second three-dimensional block based on a detection result of the detector.

9. The display device according to claim 1, wherein the controller is configured to rotate the virtual play region based on the detection result of the detector.

10. The display device according to claim 9, wherein, when the virtual play region is rotated,
the controller does not change relative distances of the movable three-dimensional blocks from a user of the display device, before and after the rotation.

11. The display device according to claim 9, wherein, when the virtual play region is rotated in the vertical direction,
the controller changes a position where the movable three-dimensional block appears, to the new upper face which faces parallel to the new bottom face.

12. The display device according to claim 11, wherein, when the virtual play region is rotated in the vertical direction,
the controller moves, simultaneously, the plurality of three-dimensional blocks that are in a stopped state, on a plurality of side faces and the bottom face of the virtual play region toward the new bottom face of the virtual play region.

13. The display device according to claim 11, wherein, when the virtual play region is rotated in the vertical direction,
the controller divides the movable three-dimensional block controlled not to be moved and all of the plurality of three-dimensional blocks that are in a stopped state, of all three-dimensional blocks in the virtual play region, into elements in sections, and moves, simultaneously, all of the divided elements toward the new bottom face of the virtual play region.

14. The display device according to claim 1, wherein the controller is configured to
detect an operation of the body holding the movable three-dimensional block, through the detector, and
move the movable three-dimensional block by sections according to an amount of movement of the body that continues the holding operation, or rotate the movable three-dimensional block by a predetermined angle corresponding to an amount of rotation.

15. The display device according to claim 14, wherein the controller is configured to
detect an operation of the body holding the movable three-dimensional block at a plurality of places, through the detector, and deform the movable three-dimensional block, or separate the movable three-dimensional block into a plurality of new three-dimensional blocks, according to movement or rotation of the body that holds the movable three-dimensional block at the plurality of places.

16. The display device according to claim 1, wherein the controller is configured to
    detect an operation of the body pressing the movable three-dimensional block, through the detector, and
    move the movable three-dimensional block by sections according to an amount of movement of the body in the pressing operation.

17. The display device according to claim 1, wherein the detector is an imaging unit or an infrared sensor that detects a shape of the body in the display space or change of the shape of the body with time.

18. The display device according to claim 1, wherein each of the divided sections in the virtual play region is a cube of the same shape.

19. The display device according to claim 1, wherein the virtual play region is a rectangular parallelepiped, and the layer includes all of the sections which have a same distance from one of a surface of the virtual play region.

20. The display device according to claim 1, wherein the controller is configured to, after all of the elements filled in the layer are erased and when other elements exist behind the erased layer in a direction of the movement, cause the other elements to move toward said direction of the movement.

21. The display device according to claim 1, wherein the layer includes all of the sections which have a same distance from any side face of the virtual play region.

22. The display device according to claim 21, wherein the controller is configured to erase, when all sections of one layer which are parallel to any one of the side faces in the virtual play region are filled with elements of the plurality of the three-dimensional and the movable three-dimensional block due to movement of the movable three-dimensional block, all of the elements in the layer, and
    to move, when the movable three-dimensional block has a first part which has been included in the erased layer and a second part which has not been included in said erased layer, the second part towards the new bottom face, after the erasure of the layer.

23. The display device according to claim 1, wherein the virtual play region is a right angle parallelepiped.

24. The display device according to claim 1, wherein the controller is configured to recognize a user's hand and when the user's hand touches the movable three-dimensional block, the three-dimensional block is movable by the user's hand.

25. A control system comprising:
    a terminal including
        a display that stereoscopically displays a plurality of three-dimensional blocks each including one or a plurality of elements each occupying one of divided sections in a virtual play region divided in a three-dimensional matrix manner in a display space, by displaying images respectively corresponding to both eyes of a user by being worn, and
        a detector that detects a position of a body in the display space; and
    a controller configured to control the terminal, wherein the controller controls the display
        to cause a movable three-dimensional block to appear from an upper face of the virtual play region,
        to move the movable three-dimensional block from the upper face toward a bottom face that faces the upper face in the virtual play region,
        to move, when change of the body with time in the display space is detected by the detector, the movable three-dimensional block in section units, based on a detection result, and
        to erase, when all sections of one layer in the virtual play region are filled with elements of the plurality of three-dimensional and the movable three-dimensional block due to movement of the movable three-dimensional block, the elements, wherein
    the layer includes all of the sections which have a same distance from the bottom face of the virtual play region, and
        to move the movable three-dimensional blocks in the virtual play region toward a new bottom face that faces the new upper face in the virtual play region, when the virtual play region is rotated in the vertical direction in such a manner that the upper face changes to a new upper face which is one of a plurality of faces of the virtual play region, wherein the new upper face is a different face from the upper face before the rotation.

26. A non-transitory, computer-readable medium that stores a control program that causes, when executed by a display device including a display that stereoscopically displays three-dimensional shapes in a display space, by displaying images respectively corresponding to both eyes of a user by being worn, and a detector that detects a position of a body in the display space, the display device to execute the steps of:
    displaying a plurality of three-dimensional blocks each including one or a plurality of elements each occupying one of divided sections to appear in a virtual play region divided in a three-dimensional matrix manner in the display space;
    causing a movable three-dimensional block to appear from an upper face of the virtual play region in the display space;
    moving the movable three-dimensional block from the upper face toward a bottom face that faces the upper face in the virtual play region;
    moving the movable three-dimensional block in section units when change of the body with time in the display space is detected;
    erasing, when all sections of one layer of the virtual play region are filled with elements of the plurality of three-dimensional and the movable three-dimensional block due to movement of the movable three-dimensional block, the elements; and
    moving the movable three-dimensional block in the virtual play region toward a new bottom face that faces the new upper face in the virtual play region, when the virtual play region is rotated in the vertical direction in such a manner that the upper face changes to a new upper face which is one of a plurality of faces of the virtual play region, wherein
    the layer includes all of the sections which have a same distance from the bottom face of the virtual play region, and
    the new upper face is a different face from the upper face before the rotation.

* * * * *